US011022073B1

(12) United States Patent
Beck et al.

(10) Patent No.: US 11,022,073 B1
(45) Date of Patent: Jun. 1, 2021

(54) ROCKET ENGINE TURBOPUMP WITH COOLANT PASSAGE IN IMPELLER CENTRAL HUB

(71) Applicant: Rocket Lab USA, Inc., Los Angeles, CA (US)

(72) Inventors: Peter Joseph Beck, Auckland (NZ); Lachlan Jesse Matchett, Auckland (NZ); Peter William Edward Barlow, Napier (NZ)

(73) Assignee: Rocket Lab USA, Inc., Los Angeles, CA (US)

( * ) Notice: Subject to any disclaimer, the term of this patent is extended or adjusted under 35 U.S.C. 154(b) by 0 days.

(21) Appl. No.: 16/946,341

(22) Filed: Jun. 17, 2020

Related U.S. Application Data

(63) Continuation of application No. 16/734,737, filed on Jan. 6, 2020, which is a continuation of application No. 15/094,809, filed on Apr. 8, 2016, now Pat. No. 10,527,003.

(60) Provisional application No. 62/146,342, filed on Apr. 12, 2015.

(51) Int. Cl.
*F02K 9/46* (2006.01)
*F04D 29/58* (2006.01)

(52) U.S. Cl.
CPC ............ *F02K 9/46* (2013.01); *F04D 29/5806* (2013.01); *F04D 29/5813* (2013.01)

(58) Field of Classification Search
CPC ..... F02K 9/46; F04D 29/5806; F04D 29/5813
See application file for complete search history.

(56) References Cited

U.S. PATENT DOCUMENTS

| | | | | |
|---|---|---|---|---|
| 2,658,455 A | * | 11/1953 | Seinfeld | F04D 29/2266 416/181 |
| 3,306,220 A | * | 2/1967 | Dahlgren | F04D 13/06 417/360 |
| 4,047,847 A | * | 9/1977 | Oikawa | F04D 13/025 417/370 |

(Continued)

FOREIGN PATENT DOCUMENTS

WO    WO2013024361    2/2013

OTHER PUBLICATIONS

Redmond et al., "Development of Cryogenic Electric Motors", SAE Transactions, vol. 72, SAE International, 1964, pp. 257-268. (Year: 1964).*

(Continued)

*Primary Examiner* — Lorne E Meade
(74) *Attorney, Agent, or Firm* — Weaver Austin Villeneuve & Sampson LLP

(57) ABSTRACT

Disclosed herein are various technologies pertinent to rocket engines, including injector, thrust chamber, and electrical turbopump devices that may be combined to provide a more efficient rocket engine. The electrical turbopump impeller includes a coolant bypass port fluidically connected with a coolant passage that passes through the impeller central hub and allows some of the propellant that is acted on by the impeller to bypass the impeller outlet and instead be flowed into the electrical turbopump housing so that the diverted propellant may be used to cool the various components housed within the housing such as the electric motor bearings, stator, rotor, and electronics.

19 Claims, 18 Drawing Sheets

(56) References Cited

U.S. PATENT DOCUMENTS

| | | | | |
|---|---|---|---|---|
| 4,478,553 A | * | 10/1984 | Leibowitz | F02C 7/1435 |
| | | | | 415/115 |
| 4,541,238 A | | 9/1985 | Scheller | |
| 4,644,207 A | * | 2/1987 | Catterfeld | F04D 13/0666 |
| | | | | 310/114 |
| 4,890,980 A | * | 1/1990 | Heald | F04D 29/2266 |
| | | | | 416/181 |
| 5,407,331 A | * | 4/1995 | Atsumi | F02M 37/048 |
| | | | | 417/420 |
| 6,457,306 B1 | | 10/2002 | Abel et al. | |
| 7,762,498 B1 | | 7/2010 | Henderson et al. | |
| 9,829,008 B2 | * | 11/2017 | Bigi | F04D 1/00 |
| 9,863,430 B2 | * | 1/2018 | Lee | F04D 25/082 |
| 9,964,073 B1 | * | 5/2018 | Pinera | F04D 7/00 |
| 10,527,003 B1 | | 1/2020 | Beck et al. | |
| 2014/0083081 A1 | | 3/2014 | Balm | |
| 2014/0260186 A1 | | 9/2014 | Bahn et al. | |
| 2014/0265692 A1 | * | 9/2014 | Schneider | F04D 29/047 |
| | | | | 310/104 |
| 2016/0195039 A1 | * | 7/2016 | Danguy | F02K 9/46 |
| | | | | 60/259 |
| 2019/0301401 A1 | * | 10/2019 | Motomura | F04D 13/04 |

OTHER PUBLICATIONS

Dlugiewicz et al., Permanent Magnet Synchronous Motor to Drive Propellant Pump, International Symposium on Power Electronics, Electric Drives, Automation and Motion, 2012, pp. 822-826. (Year: 2012).*

U.S. Office Action dated Mar. 28, 2019, in U.S. Appl. No. 15/094,809.

U.S. Notice of Allowance dated Aug. 28, 2019, in U.S. Appl. No. 15/094,809.

U.S. Appl. No. 16/734,737, filed Jan. 6, 2020, Beck et al.

* cited by examiner

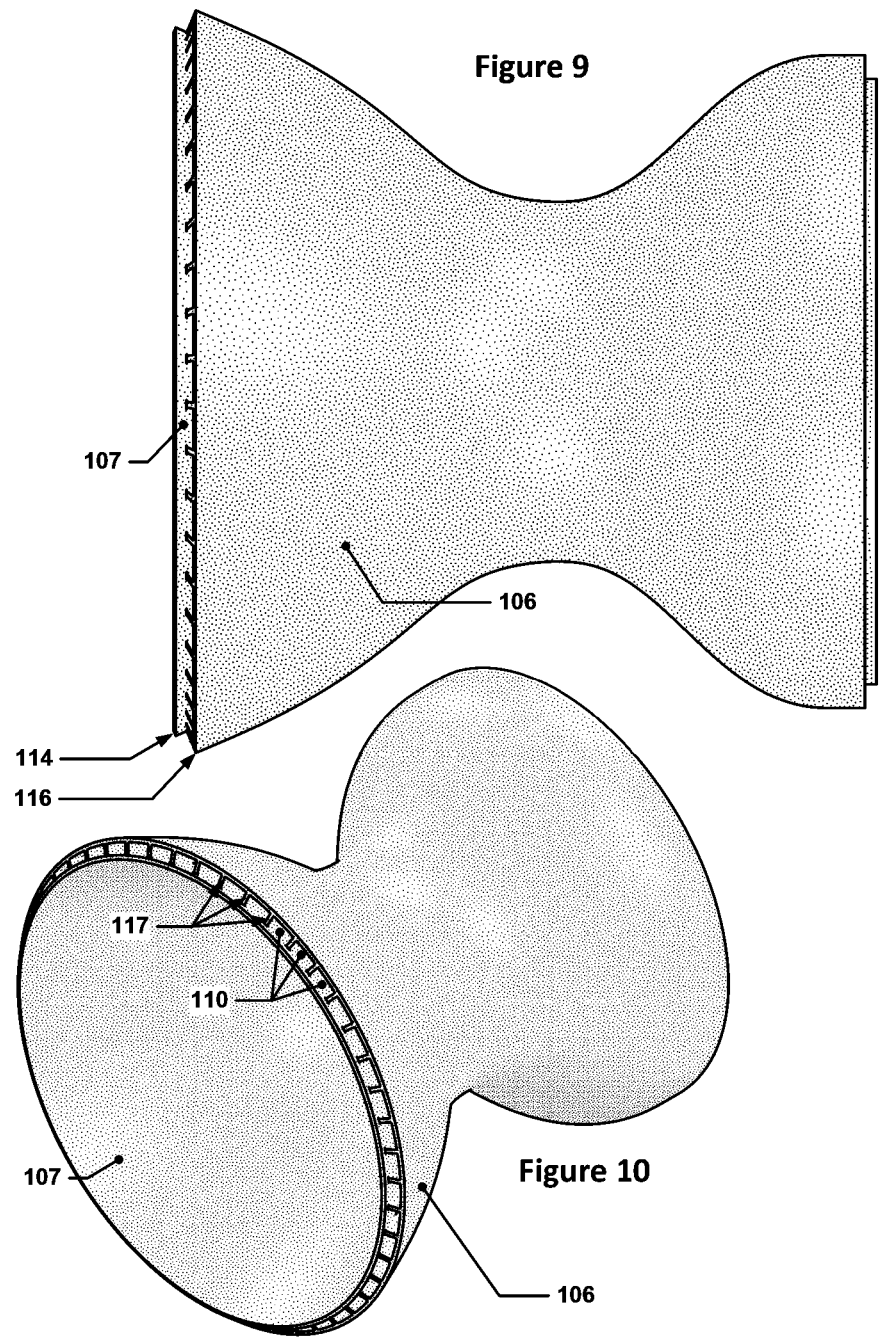

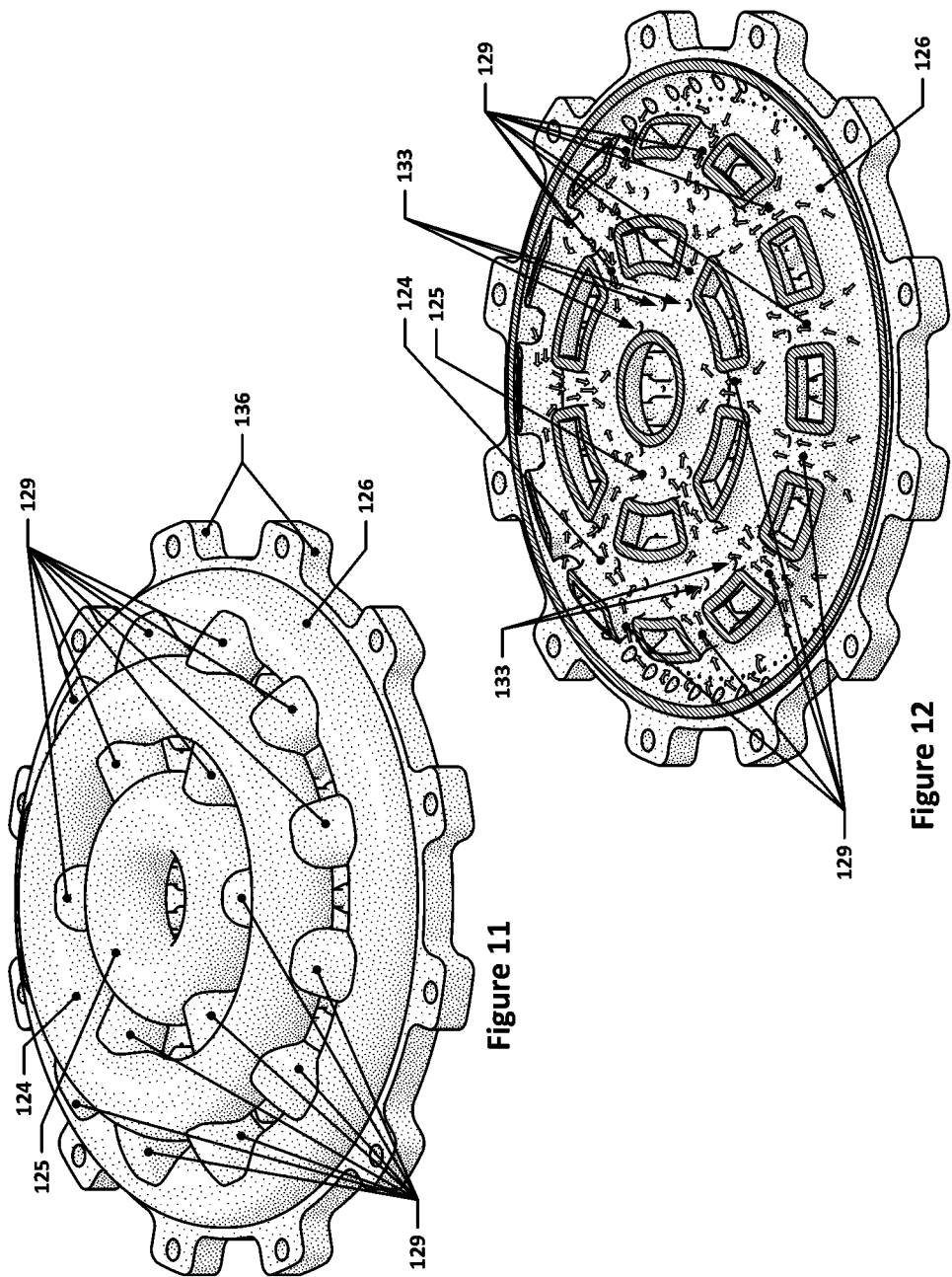

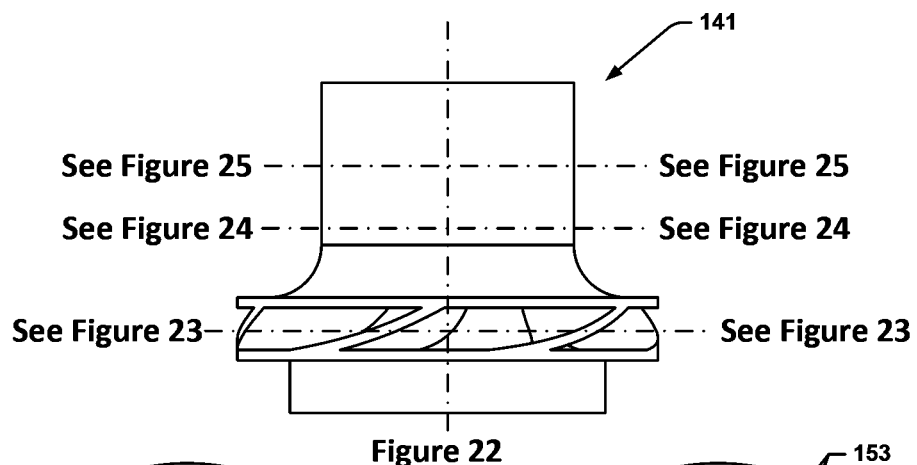
Figure 22
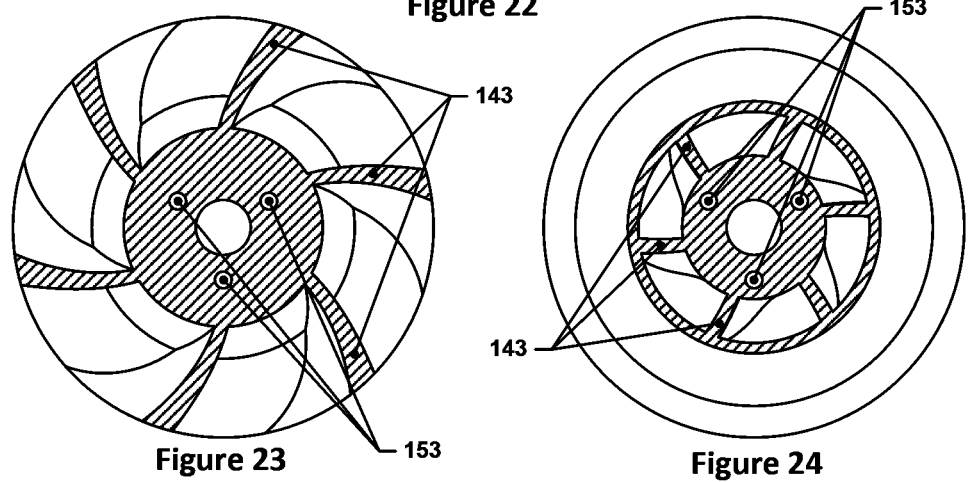
Figure 23
Figure 24
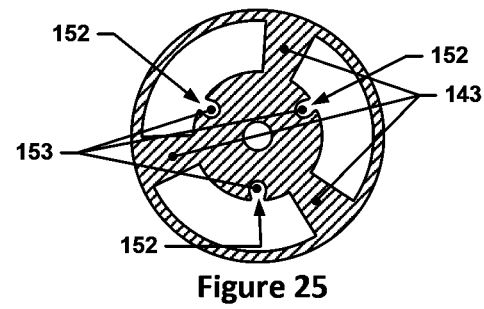
Figure 25

ROCKET ENGINE TURBOPUMP WITH COOLANT PASSAGE IN IMPELLER CENTRAL HUB

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

The present disclosure relates to rocket engines and various components and systems that may be used in rocket engines. More specifically, this disclosure is directed at rocket engines, thrust chambers for such rocket engines, injectors for such rocket engines, and electric turbopumps for such rocket engines, as well as to various combinations of such components. This disclosure is also directed at various manufacturing techniques that may be of use in producing such components.

DESCRIPTION OF RELATED TECHNOLOGY

The present invention relates to liquid propellant rocket engines, in particular bi-propellant liquid rocket engines. Liquid rocket engines typically include a thrust chamber, which takes the form of a convergent-divergent nozzle, that is provided with two propellants, for example, a fuel and an oxidizer, via an injector that is located at the convergent end of the nozzle. In traditional rocket engines, gas-driven turbopumps have been used to pump the propellants into the injector at a high fluid flow rate. Thrust chambers provide the location for reaction/combustion of the propellants in a liquid rocket engine. The thrust chamber must be capable of withstanding the heat of combustion and must direct the products of combustion to provide lift for the rocket. It is typical for thrust chambers to have some form of cooling to reduce the heat load on the thrust chamber walls. Regenerative cooling, in which one of the propellants is circulated through the walls of the thrust chamber before entering the thrust chamber, can provide suitable cooling.

Injectors typically cap the end of the thrust chamber opposite the exhaust end of the thrust chamber. In a rocket engine, the injector is used to ensure an appropriate dispersion of propellant occurs in the thrust or combustion chamber. The injector is typically positioned at the top of the combustion chamber as either a unitary structure, e.g., part of the thrust chamber, or as a separate structure, e.g., a cap that is bolted or clamped to the thrust chamber via some form of releasable connection. The simplest injector is a plate member having a plurality of apertures through which propellant/s may flow. In bi-propellant rocket engines that use two separate propellants, such as a fuel and an oxidizer, the first and second liquid propellants are kept separate until they pass through the injector. The injector apertures may be arranged in doublets and angled so that the two propellant streams of the doublet intersect to atomize the propellant for improved dispersion within the thrust chamber.

As mentioned, gas-driven turbopumps are typically used to supply propellant to the injector of a rocket engine. Traditionally, such turbopumps have been gas-driven, e.g., powered by expanding gas or pressurized gas systems that drive a turbine that, in turn, drives the turbopump impeller. Turbopumps typically reach speeds of 20,000 rpm to 60,000 rpm, and present unique design challenges not found in lower speed, conventional pumps.

SUMMARY

In some implementations, a thrust chamber for a rocket engine is provided. The thrust chamber may include an exterior skin, as well as an interior skin offset from the exterior skin so as to form a first gap between the exterior skin and the interior skin and a plurality of walls bridging between the exterior skin and the interior skin and located within the first gap. The walls may define a plurality of coolant flow passages that extend from a first end of the thrust chamber to a second end of the thrust chamber. At least some portions of one or more of the coolant flow passages may have a different surface roughness than at least some other portions of the one or more coolant flow passages.

In some implementations, at least some portions of the one or more of the coolant flow passages may have a surface roughness that is at least two times greater than the surface roughness of at least some other portions of the one or more coolant flow passages.

In some implementations, the thrust chamber may include one or more sections, and the exterior skin, the interior skin, and the plurality of walls, with respect to at least each section, may be a contiguous sintered metal structure. In some such implementations, the one or more sections may be manufactured using direct metal laser sintering. In some additional or alternative such implementations, the sections may be made from an alloy selected from the group consisting of: titanium alloys, steel alloys, inconel 625, inconel 718, Ti6Al4V, stainless steel alloys, maraging steel alloys, and copper alloys.

In some implementations, the thrust chamber may include a barrel section, a throat section, and an expansion section. The throat section may be between the barrel section and the expansion section and has an average inner diameter that is smaller than the average inner diameter of the barrel section and that is smaller than the average inner diameter of the expansion section. At least some portions of one or more of the coolant flow passages in the throat section may have a surface roughness that is greater than the surface roughness of at least some portions of one or more of the coolant flow passages in the barrel section, the expansion section, or the barrel section and the expansion section.

In some such implementations, at least some portions of the one or more of the coolant flow passages in the throat section may have a surface finish that is 1.25 to 3.5 times rougher than the surface finish of the at least some portions of the one or more of the coolant flow passages in the barrel section. In some additional or alternative implementations, at least some portions of the one or more of the coolant flow passages in the throat section may have a surface finish that is 1.5 to 5.6 times rougher than the surface finish of the at least some portions of the one or more of the coolant flow passages in the expansion section.

In some implementations, the thrust chamber may includes a barrel section, a throat section, and an expansion section, and the average particle diameter of metal particles used in making the sintered metal structure of the throat section may be between 1.8 and 2.2 times larger than the average particle diameter of metal particles used in making the sintered metal structure of the barrel section, thereby resulting in a different surface roughness between at least some portions of one or more of the coolant flow passages.

In some additional or alternative such implementations, the thrust chamber may include a barrel section, a throat section, and an expansion section, and the average particle diameter of metal particles used in making the sintered metal structure of the throat section is between 3.6 and 4.4 times larger than the average particle diameter of metal particles used in making the sintered metal structure of the expansion section, thereby resulting in a different surface roughness between at least some portions of one or more of the coolant flow passages.

In some implementations, the thrust chamber may include a barrel section, a throat section, and an expansion section, and at least some portions of the sintered metal structure of the throat section may be made in a DMLS process that uses a lower laser beam intensity than the laser beam intensity used to make at least some portions of the sintered metal structure of the barrel section in a DMLS process, thereby resulting in a different surface roughness between at least some portions of one or more of the coolant flow passages. In some additional or alternative such implementations, the thrust chamber may include a barrel section, a throat section, and an expansion section, and at least some portions of the sintered metal structure of the throat section may be made in a DMLS process that uses a lower laser beam intensity than the laser beam intensity used to make at least some portions of the sintered metal structure of the expansion section in a DMLS process, thereby resulting in a different surface roughness between at least some portions of one or more of the coolant flow passages.

In some implementations of the thrust chamber, there may be at least two sections and at least two of the sections may be formed as a single, contiguous part. In some implementations, there may be a plurality of sections, each section may be formed as a discrete component, and the sections may be welded together to form the thrust chamber.

In some additional implementations, the thrust chamber may further include a lap joint adapter. In such implementations, the interior skin of a first section of the sections may have a first edge, the interior skin of a second section of the sections may have a second edge, and the first edge may be welded to the second edge at a first weld. The exterior skin of the first section may also have a third edge that is offset from the first edge in a direction parallel to the interior skin of the first section at one or more locations along the first edge and perpendicular to the first edge at one or more locations along the first edge. A second gap may exist between the third edge and a fourth edge of the exterior skin of the second section, the lap joint adapter may be welded to the exterior skin of the first section at a second weld and is welded to the exterior skin of the second section at a third weld, and the lap joint adapter may span the second gap.

In some such implementations, the fourth edge may be offset from the second edge in a direction parallel to the interior skin of the second section at one or more locations along the second edge and perpendicular to the second edge at one or more locations along the second edge.

The walls of the first section may not extend to the first edge in some implementations, and in some other implementations, the walls of the first section may not extend past the second edge.

In some implementations, a method is provided. The method may include using an additive manufacturing process to form a thrust chamber for a rocket engine. The thrust chamber may include an exterior skin, an interior skin offset from the exterior skin so as to form a first gap between the exterior skin and the interior skin, and a plurality of walls bridging between the exterior skin and the interior skin and located within the first gap. The walls may define a plurality of coolant flow passages within the gap that extend from a first end of the thrust chamber to a second end of the thrust chamber. The method may further include causing the additive manufacturing process to vary the surface finish of at least some portions of one or more of the coolant flow passages such that the surface roughness of the at least some portions of the one or more of the coolant flow passages is different than the surface roughness of at least some other portions of the one or more coolant flow passages.

In some such methods, the additive manufacturing process may be a direct metal laser sintering process.

In some implementations of the method, the method may include causing the additive manufacturing process to vary the surface finish of the at least some portions of the one or more of the coolant flow passages such that the surface roughness of the at least some portions of the one or more of the coolant flow passages is different than the surface roughness of the at least some other portions of the one or more coolant flow passages by varying an average particle diameter of metal particles used in the direct metal laser sintering process between formation of the at least some portions of the one or more of the coolant flow passages and formation of the at least some other portions of the one or more coolant flow passages.

In some implementations of the method, the method may include causing the additive manufacturing process to vary the surface finish of the at least some portions of the one or more of the coolant flow passages such that the surface roughness of the at least some portions of the one or more of the coolant flow passages is different than the surface roughness of the at least some other portions of the one or more coolant flow passages by using a lower laser beam intensity than the laser beam intensity used to make the at least some other coolant flow passages.

In some implementations of the method, the thrust chamber may include a plurality of sections, each section may be formed as a discrete part using the additive manufacturing process, and the metal particles used to create at least one of the sections may have a larger average diameter than the metal particles used to create at least one of the other sections. In some such implementations, the method may further include welding the sections together after the sections are formed in order to create the thrust chamber.

In some implementations of the method, the thrust chamber may include a barrel section, a throat section, and an expansion section. The throat section may be between the barrel section and the expansion section and may have an average inner diameter that is smaller than the average inner diameter of the barrel section and that is also smaller than the average inner diameter of the expansion section. In such implementations, the metal particles used in the direct metal laser sintering process to create at least a portion of the throat section may have an average particle diameter that is larger than the average particle diameter of the metal particles used in the direct metal laser sintering process to create at least one of: the barrel section, the expansion section, or the barrel section and the expansion section.

In some implementations, a method of manufacturing a thrust chamber for a rocket may be provided. The method may include providing a first section and providing a second section. The first section and the second section may each include: an exterior skin, an interior skin offset from the exterior skin so as to form a first gap between the exterior skin and the interior skin, and a plurality of walls bridging between the exterior skin and the interior skin and located within the first gap. The interior skin of the first section may have a first edge, the interior skin of the second section may have a second edge, the exterior skin of the first section may have a third edge that is offset from the first edge in a direction parallel to the interior skin of the first section at one or more locations along the first edge and perpendicular to the first edge at one or more locations along the first edge, and a second gap may exist between the third edge and a fourth edge of the exterior skin of the second section. The method may further include accessing the first edge and the second edge through the second gap and forming a weld along the first edge and the second edge, and positioning a lap joint adapter such that one edge of the lap joint adapter is proximate to the exterior skin of the first section, another edge of the lap joint adapter is proximate to the exterior skin of the second section, and the lap joint adapter spans across the second gap. The method may further include welding the edge of the lap joint adapter that is proximate to the exterior skin of the first section to the exterior skin of the first section and welding the edge of the lap joint adapter that is proximate to the exterior skin of the second section to the exterior skin of the second section. In some implementations, the weld between the first edge and the second edge may be a laser beam weld.

In some implementations, an injector for a rocket engine may be provided. The injector may include a plate with a plurality of first propellant ports fluidically connecting one side of the plate with an opposing side of the plate, a propellant distribution plenum, a plurality of annular plenums including a first annular plenum and a second annular plenum, a plurality of radial passages, and a plurality of support columns. The propellant distribution plenum may be annular and may have an outer diameter and an inner diameter, each annular plenum may have an outer diameter and an inner diameter, and the inner diameter of the first annular plenum may be larger than the outer diameter of the second annular plenum. The radial passages may include radial passages that fluidically connect the propellant distribution plenum and the first annular plenum and are equidistantly spaced about the outer diameter of the first annular plenum as well as radial passages that fluidically connect the first annular plenum and the second annular plenum and are equidistantly spaced about the outer diameter of the second annular plenum. The first annular plenum and the second annular plenum may both be offset from the plate, and each support column of the plurality of support columns may span between the plate and one of the annular plenums and may include a column base adjacent to the plate, a base plenum within the column base, a riser passage that fluidically connects the base plenum with the annular plenum to which the support column spans, and at least one second propellant port. The first propellant ports may not be collocated with the second propellant ports.

In some such implementations, the injector may be a single, contiguous component. In some such implementations, the injector may be a single, contiguous sintered metal structure.

In some implementations of the injector, the first propellant ports may be arranged in a plurality of concentric circular patterns, the second propellant ports may also be arranged in a plurality of concentric circular patterns, each of the first propellant ports may be equidistant from the two closest second propellant ports, and each of the second propellant ports may be equidistant from the two closest first propellant ports.

In some such implementations, each circular pattern of first propellant ports may have a corresponding circular pattern of second propellant ports, and each circular pattern of first propellant ports and that circular pattern of first propellant port's corresponding circular pattern of second propellant ports may have the same circular pattern diameter.

In some implementations, each support column may include a pair of second injector ports that are angled with respect to one another such that propellant that is jetted through one of the second injector ports of each pair of second injector ports intersects with propellant that is jetted through the other second injector port of each respective pair of second injector ports.

In some implementations, each of the radial passages that fluidically connects the first annular plenum and the second annular plenum may be located at a location equidistant from the two closest radial passages that fluidically connect the distribution plenum and the first annular plenum.

In some implementations, the plurality of annular plenums may includes three or more annular plenums, the annular plenums may all be concentric with one another, each annular plenum that is radially interposed between two adjacent annular plenums may be fluidically connected with each adjacent annular plenum via a subset of the radial passages and the subset of the radial passages includes radial passages located along the outer diameter of that annular plenum as well as radial passages located along the inner diameter of that annular plenum, and the radial passages that are located along the inner diameter of each annular plenum that is radially interposed between two adjacent annular plenums may be equidistant from the two closest radial passages that are located along the outer diameter of that annular plenum.

In some implementations, the propellant distribution plenum may include a plurality of propellant inlet ports that pass through the plate. In some additional or alternative such implementations, the first propellant ports, when viewed along a center axis of the annular plenums such that the annular plenums are closer than the plate, may be occluded from view by the annular plenums.

In some implementations, a turbopump may be provided. The turbopump may include an impeller, and the impeller may have a central hub, a plurality of vanes arranged in one or more radially symmetric patterns about a central axis of the central hub, an impeller inlet configured to accept fluid flowing in a direction parallel to the central axis, and an impeller outlet configured to flow fluid passing through the impeller in a direction away from the central axis. The turbopump may also include a motor operatively connected with the impeller and configured to rotate the impeller and a housing. The housing may have a turbopump inlet, the turbopump inlet aligned with the impeller inlet and configured to direct fluid provided to the turbopump into the turbopump inlet, a turbopump outlet, the turbopump outlet aligned with the impeller outlet and configured to receive fluid from the turbopump outlet, and one or more coolant outlets. The turbopump outlet may include a substantially circumferential passage that encircles the impeller outlet. The impeller hub may further include a plurality of coolant passages. Each coolant passage may include a coolant bypass port located between the impeller inlet and the impeller outlet. Each coolant bypass port may be in fluidic communication with fluid that is pumped through the impeller, and each coolant passage may fluidically connect the corresponding coolant bypass port with a cooling volume of the housing located on an opposite side of the impeller from the impeller inlet and containing the motor. The one or more coolant outlets may be fluidically connected with the cooling volume.

In some implementations, the turbopump may be connected with a rocket engine, a first propellant source, a first propellant supply line configured to supply a first propellant from the first propellant source to the turbopump inlet, and one or more coolant return lines configured to route the first propellant that passes into the cooling volume via the coolant passages and then out of the cooling volume via the one or more coolant outlets such that the first propellant that passes out of the cooling volume via the one or more coolant outlets is returned to the first propellant supply line and re-introduced into the turbopump inlet.

In some implementations, the turbopump may further include a shaft that couples the impeller to the motor, and a plurality of unsealed rotational bearings that supports the shaft, wherein the turbopump is configured such that fluid that flows into the cooling volume flows through at least one of the rotational bearings via gaps between bearing elements of the at least one rotational bearing.

In some implementations, the motor may include a stator and a rotor, the stator and the rotor may be separated from one another by an annular gap, and the volume between the rotor and the stator that is defined by the annular gap may be part of the cooling volume.

In some implementations, the coolant passages may be arranged in a radially symmetric array about the central axis.

In some implementations, each coolant passage may be parallel to the central axis after the corresponding coolant bypass port.

In some implementations, each coolant bypass port may be located at a point in the hub where the fluid pressure is between 10 and 80% of the fluid pressure at the impeller outlet when the turbopump is running.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 9 depicts a side view of a throat section of the example thrust chamber of FIG. 1.

FIG. 10 depicts an isometric view of the throat section of the example thrust chamber of FIG. 1.

FIG. 11 depicts an isometric view of the injector of the example thrust chamber of FIG. 1.

FIG. 12 depicts an isometric cutaway view of the injector of the example thrust chamber of FIG. 1.

FIG. 22 depicts a side view of the impeller for the example electrically-driven turbopump of FIG. 21.

FIG. 23 depicts a section view of the impeller for the example electrically-driven turbopump of FIG. 21.

FIG. 24 depicts another section view of the impeller for the example electrically-driven turbopump of FIG. 21.

FIG. 25 depicts yet another section view of the impeller for the example electrically-driven turbopump of FIG. 21.

DETAILED DESCRIPTION

Figure 1:
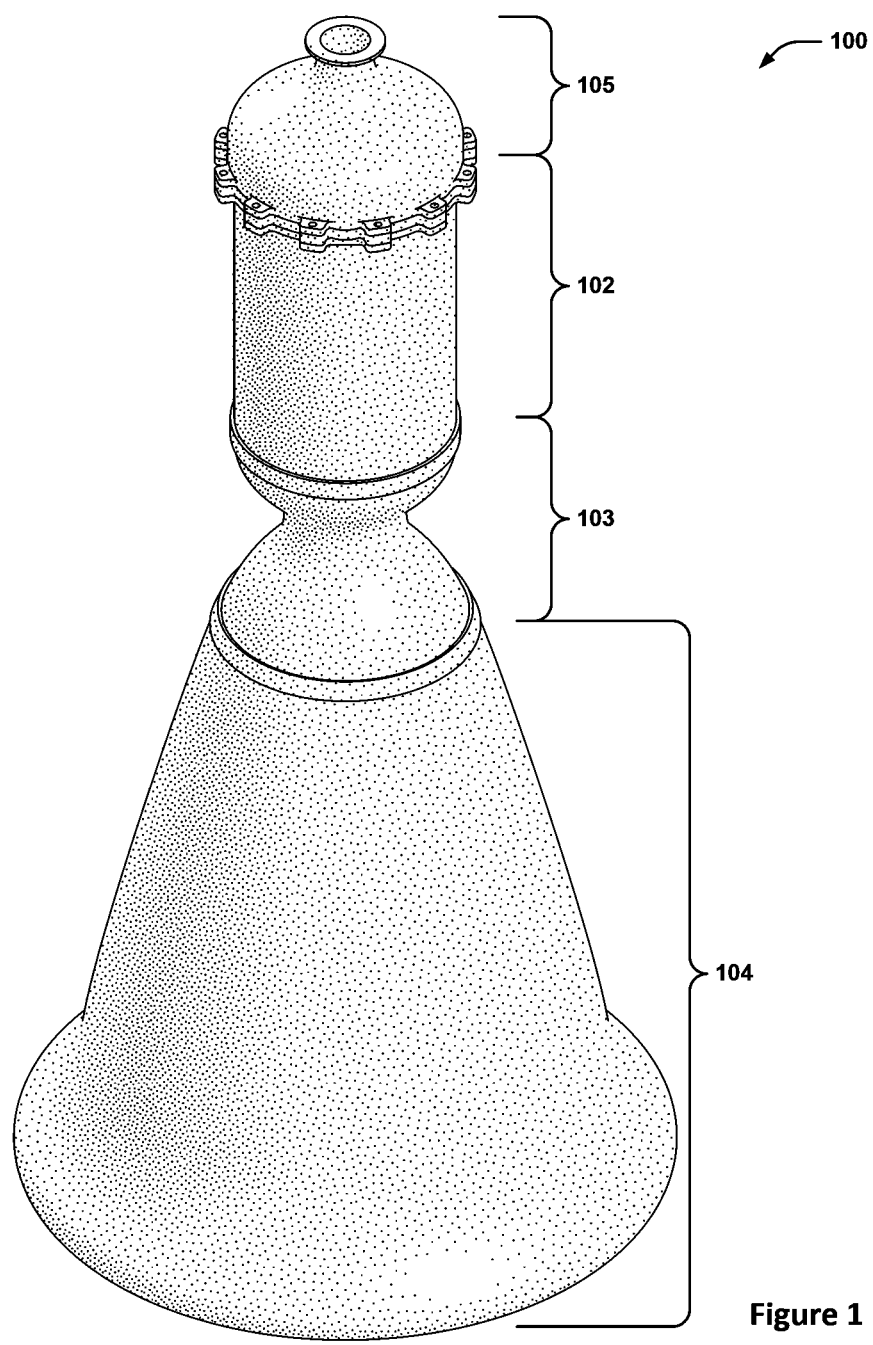
FIG. 1 depicts an isometric view of an example thrust chamber and injector.

Traditional rocket engine production techniques have generally involved complex assembly procedures for manufacturing thrust chambers, injectors, and turbopump systems.

For example, thrust chambers with integral cooling passages have traditionally been manufactured by machining a metallic forging or billet with exterior channels. The exterior channels would then be filled with a conductive wax to allow an electrodeposited layer of metal to form an outer structural layer. The conductive wax is then melted out, creating the internal cooling passages and a strong lightweight metallic thrust chamber. Such thrust chamber manufacturing techniques offer high performance but are costly and time-consuming to manufacture.

Injectors are typically manufactured using platelet techniques. In such an injector, the design is sliced into many thin sections called platelets which are fractions of millimeters thick; each platelet is manufactured from a metallic sheet using etching techniques. The multiple platelets that make up the injector are then stacked together to create the entire injector and are thermally fused together at very high pressures and temperatures, this creates a solid metallic injector with all of the necessary internal propellant flow passages. Such injector manufacturing techniques are complex and costly.

A traditional turbopump assembly for a rocket engine typically includes centrifugal propellant pumps that are mechanically driven by a turbine or turbines. The system is very complex to control because a small propellant flow from the propellant pumps is required to supply a gas generator that powers the turbine(s). This creates a highly coupled system which makes accurate and reliable engine operation difficult to develop and achieve.

The present inventors determined that using additive manufacturing techniques in the production of various components used in such systems could greatly simplify the assembly, and indeed the overall design, of such systems. In particular, the present inventors determined that using direct metal laser sintering processes to manufacture various components would greatly decrease the assembly complexity of such systems.

Traditional machining typically involves "subtractive" manufacturing—in other words, a component typically starts as a piece of material that is larger than the desired component and material is then selectively removed, i.e., "subtracted," in order to realize the desired shape. Of course, casting and injection molding processes may be used in order to produce near-net-shape components, but such techniques typically have a high initial cost since molds must be developed, and are thus not cost effective for low production volume components.

In additive manufacturing, the component typically starts out as empty space and a specialized printer then deposits material layer-by-layer in order to build up the part. In direct laser metal sintering (DLMS), loose metal particles are deposited in areas where the component will have material structure and then a focused laser beam is used to fuse the particles at those locations together in order to form a solid, contiguous structure. The result is a component that has a sintered metal structure. There are other forms of additive manufacturing that may be used in place of DMLS, such as selective laser melting (SLM).

Additive manufacturing allows for complex geometries to be formed that are difficult or impossible to achieve using traditional, subtractive machining techniques or casting/injection molding techniques. The present inventors determined that such flexibility in terms of part geometry offered unique opportunities in the field of rocket engine design. Many, although not necessarily all, of the various concepts discussed herein are particularly suitable for implementation using additive manufacturing.

FIG. 1 depicts an isometric view of an example thrust chamber and injector. A rocket engine 100 is visible in FIG. 1. The rocket engine 100 includes a thrust chamber 101, which has several sections: a barrel section 102, a throat section 103, and an expansion section 104. The rocket engine also includes an injector (not called out in this Figure) and a cap 105, through which one of two propellants may be introduced for eventual delivery to the thrust chamber 101 via the injector.

The propellants typically enter the thrust chamber 101 through an inlet such as the injector 122 at the second end 112 of the thrust chamber 101, react and are accelerated through the throat section 103 and exit through the outlet or expansion section 104 at the first end 111 of the thrust chamber 101. The expansion section 104, which may form a nozzle, may be connected to, or part of, the outlet at the second end 112 to provide an expansion guide for the reaction products produced via combustion. The appropriate nozzle or expansion section 104 size may vary dependent on factors including the thrust to be produced and the atmospheric pressure where the thrust chamber 101 is to be used. In some embodiments the nozzle or expansion section 104 may form an integral part of the thrust chamber. In other embodiments the thrust chamber is releasably connected to the injector and the nozzle.

Figure 2:
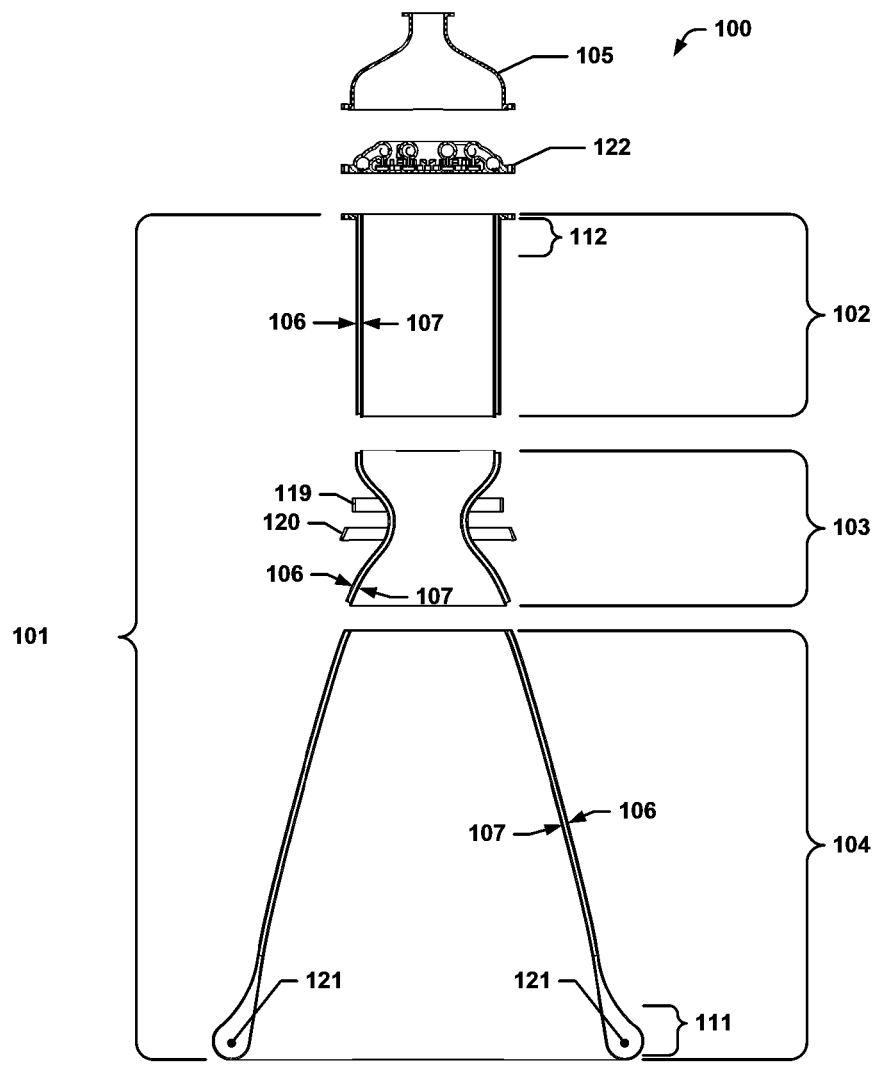
FIG. 2 depicts an exploded side section view of the example thrust chamber of FIG. 1.

FIG. 2 depicts an exploded side section view of the example thrust chamber of FIG. 1. As can be seen, the injector 122 may be interposed between the cap 105 and the barrel section 102. It is to be understood that, in some implementations, one or more of the injector 122, the cap 105, the barrel section 102, the throat section 103, and the expansion section 104 may be formed as a single piece using additive manufacturing, or may, as shown here, be formed as separate pieces that may then be welded, bolted, and/or clamped together.

The thrust chamber 101 is preferably constructed using an additive manufacturing or 3-dimensional (3D) printing technique, for example, using laser metal sintering. A suitable material for the thrust chamber is titanium, as titanium has a low density relative to its strength. The shape of the thrust chamber may include a first substantially cylindrical section, such as the barrel section 102, which then transitions into the throat section 103 of the thrust chamber 101; the throat section 103 acts to accelerate the combustion products using the Venturi effect.

The thrust chamber 101 is formed of three sections, although other implementations may break the thrust chamber 101 into fewer or greater numbers of sections, or may utilize a thrust chamber that is unitary, i.e., that is composed of only one section. The number of sections used may typically be a trade-off between the number of joins required and the size of each section. The multiple sections of the thrust chamber must be combined once manufactured. Instead of using a series of connected flanges which add both weight and complexity to the thrust chamber 101, joining of the sections may be achieved by welding the thrust chamber 101 sections together, as discussed in more detail later in this disclosure. As the thrust chamber has a double-walled structure, a welding method has been developed to combine the plurality of sections; this welding method is described in more detail later in this disclosure as well.

The barrel section 102, the throat section 103, and the expansion section 104 may each include an exterior skin 106 and an interior skin 107, as well as a series of fins or walls (pictured later) that span between the exterior skin 106 and the interior skin 107, which may also be referred to herein as an outer wall and inner wall, respectively. Each section is actually a double-walled structure where the gap between the exterior skin 106 and the interior skin 107 is compartmentalized into discrete coolant flow passages for flowing coolant through the sections.

Each section may be joined to the adjoining section using a lap joint adapter. For example, the barrel section 102 and the throat section 103 may be joined together using a first lap joint adapter 119, and the throat section 103 and the expansion section 104 may be joined together using a second lap joint adapter 120. The particulars of such a joining operation are discussed in more detail later in this disclosure.

Once the thrust chamber 101 is assembled by joining the various sections together, coolant may be flowed from an annular cooling plenum 121 located at a first end 111 of the thrust chamber, through coolant flow passages that are located between the exterior skin 106 and the interior skin 107 of each section, and to a second end 112 of the thrust chamber 101. In implementations where a rocket engine propellant is used as the coolant, the coolant/propellant may then be fed from the second end 112 of the thrust chamber 101 into the injector 122, where it may then be redirected to flow into the volume of the barrel section 102 that is bounded by the interior skin 107 of the barrel section 102.

Figures 3, 4:
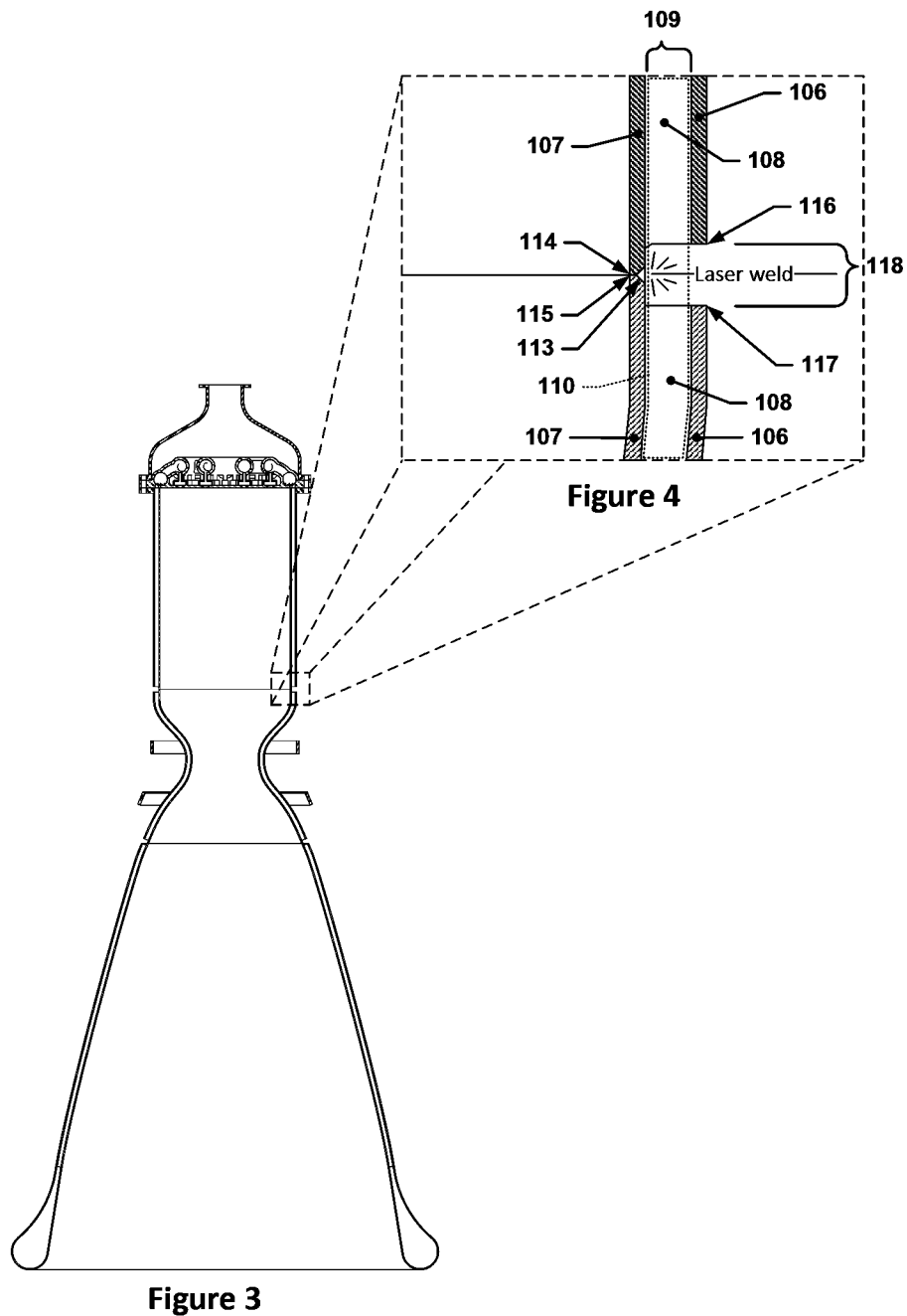
FIG. 3 depicts a partially exploded side section view of the example thrust chamber of FIG. 1.
FIG. 4 depicts a detail view of a portion of FIG. 3.

FIG. 3 depicts a partially exploded side section view of the example thrust chamber of FIG. 1. As discussed above, the sections of the thrust chamber 101 may be joined together using a welding technique. In order to facilitate this technique, the sections that are to be joined together may have a particular arrangement of features in the weld region. In FIG. 3, the sections have been mated together, but the first lap joint adapter 119 and the second lap joint adapter 120 have not yet been moved into position. FIG. 4 depicts a detail view of a portion of FIG. 3. FIG. 4 depicts in greater detail various particulars regarding the construction of one of two of the sections of the example thrust chamber 101 in the vicinity of the weld joint. It is to be understood that other weld joints between these and other sections may include similar design features and be constructed in a similar manner.

As can be seen in more detail in FIG. 4, the exterior skin 106 and the interior skin 107 of both sections are spaced apart by a first gap 109. A series of walls 108 may span between the exterior skin 106 and the interior skin 107 along the length of each section. The walls 108 may serve several purposes, including supporting the exterior skin 106 relative to the interior skin 107 (and vice-versa), directing the flow of coolant within the sections, and serving as a heat conduction and dissipation interface between the interior skin 107 and the exterior skin 106 (as well as whatever coolant is flowed through the sections). The exterior skin 106, the interior skin 107, and the walls 108 of each section may define a plurality of coolant flow passages 110 that route coolant in a direction generally aligned with, but opposite to, the thrust direction of the thrust chamber 101.

The conduits or coolant flow passages 110 allow the passage of a cooling fluid, typically one of the propellants and preferably the fuel, which is used to cool the inner wall or interior skin 107. The cooling fluid may enter the conduit through an entrance chamber, such as annular propellant distribution plenum 126. The entrance to the chamber may be located at the base of the nozzle or another selected lower point of the thrust chamber 101. Alternatively, the thrust chamber 101 may have multiple sets of conduits or coolant flow passages 110 that cover portions of the length of the thrust chamber 101 between the first end 111 and the second end 112. These multiple conduits may be connected together or have separate inlets, e.g., there may be multiple annular cooling plenums located at different positions along the length of the thrust chamber 101, and each may feed a separate set of coolant flow passages 110. Cooling of the thrust chamber 101 is generally necessary because the temperatures achieved in the thrust chamber 1GG01 must be kept below the melting point of the material from which the thrust chamber 101 is manufactured, for instance, titanium. The amount of cooling required is dependent on the size of, and heat generated by, the thrust chamber 101 as well as the thermal efficiencies/heat transfer through the inner wall or interior skin 107 of the thrust chamber 101. The conduits or coolant flow passages 110 separate the flow of the cooling fluid into separate streams, which improves the efficiency of heat transfer between the cooling fluid and the thrust chamber 101. The conduits or coolant flow passages 110 are preferably orientated vertically, with respect to the orientation of FIG. 1, (parallel to the central axis of the thrust chamber 101) and have cross-sections which vary substantially proportionally with the changing diameter of the thrust chamber 101.

The annular cooling plenum 121 or chamber which supplies the conduits or coolant flow passages 110 may be located at the first end 111, typically the base, of the thrust chamber 101, although the position may be varied as required. The annular cooling plenum is preferably connected or connectable to an inlet such as conduit or pipe that provides a source of cooling fluid, e.g., from a turbopump. In some implementations, this inlet may provide coolant to an annular cooling plenum 121 or chamber which encircles the thrust chamber, and the coolant flow passages 110 may fluidically connect with the annular cooling plenum. The outlets of the conduits or coolant flow passages 110 may be located at the second end 112, typically at the top, of the thrust chamber. The outlets of the coolant flow passages may, in some implementations, be directly fluidically connected with the injector so that when a propellant is used as the cooling fluid, such propellant flows directly from the conduits or coolant flow passages 110, into the injector 122, and through the injector 122 to the thrust chamber 101. Alternatively the outlets of the conduits or coolant flow passages 110 may be connected to a pipe or similar conduit.

As can be seen, the interior skin 107 of the barrel section 102 extends past the exterior skin 106 of the barrel section 102, and provides a first edge 114 that may be butted up against a corresponding second edge 115 of the throat section 103. The first edge 114 may be offset from a third edge 116 of the barrel section 102 in a direction that is both parallel to the interior skin 107 at one or more locations along the first edge 114 and perpendicular to the first edge 114 at those one or more locations along the first edge 114.

Similarly, the interior skin 107 of the throat section 103 extends past the exterior skin 106 of the throat section 103 to provide the second edge 115. The second edge may be offset from a fourth edge 117 of the throat section 103 in a direction that is both parallel to the interior skin 107 at one or more locations along the fourth edge 117 and perpendicular to the second edge 115 at those one or more locations along the second edge 115.

Thus, the third edge 116 and the fourth edge 117 are spaced apart from one another and form a second gap 118, through which access to the interior skin 107 may be obtained in order to perform a welding operation. For example, a circumferential weld 113 may be formed at the interface between the first edge 114 and the second edge 115 using a laser welding process. The walls 108 may, as shown, stop short of extending into the second gap 118, although in other implementations, the walls 108 may extend partially into the second gap 118, or even extend as far as the interior skin 107 do—in such cases, the weld 113 may not only weld the first edge 114 and the second edge 115 together, but may also weld the ends of the walls 108 together, although this is a much more complicated welding process. It is to be understood that when the walls 108 do not abut one another, as is the case in the implementation shown in FIG. 4, a circumferential discontinuity in the coolant flow passages 110 may be formed; this circumferential discontinuity may allow coolant to, in effect, flow from a coolant flow passage 110 located at one angular position about the circumference of the thrust chamber 101 to a coolant flow passage 110 located at another angular position about the circumference of the thrust chamber 101. Such discontinuities have not been observed to significantly impact cooling performance in thrust chambers such as the thrust chamber 101. It is to be understood that while a laser welding process is used in the examples discussed herein, other welding techniques may be used, as appropriate. For example, electron beam welding or friction stir welding may be used to join the two interior skin edges. The welds that are performed may involve the use of an additional filler material or may use only the materials of the sections being joined.

Figures 5, 6:
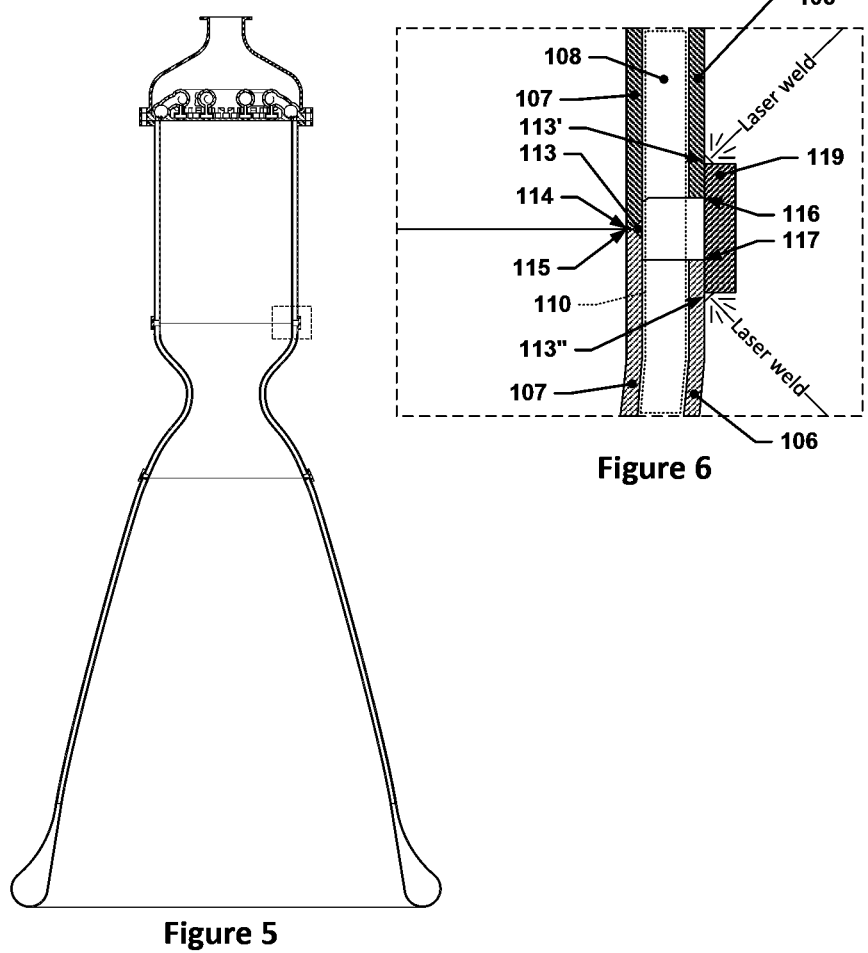
FIG. 5 depicts a side section view of the example thrust chamber of FIG. 1.
FIG. 6 depicts a detail view of a portion of FIG. 5.

FIG. 5 depicts a side section view of the example thrust chamber of FIG. 1. FIG. 6 depicts a detail view of a portion of FIG. 5. As can be seen in these views, the first lap joint adapter 119 and the second lap joint adapter 120 have been moved into position over the join between the barrel section 102 and the throat section 103 and the join between the throat section 103 and the expansion section 104, respectively. The first lap joint adapter 119 may be sized such that, when it is installed, it spans across the second gap 118 and covers the third edge 116 and the fourth edge 117. The first lap joint adapter 119 may then be welded to the exterior skin 106 of the barrel section 102 and to the exterior skin 106 of the throat section 103 at welds 113' and 113", respectively. The first lap joint adapter 119 thus acts to seal the second gap 118 and prevent coolant from spraying out of the second gap 118, and also serves to structurally strengthen the joint between the barrel section 102 and the throat section 103. A similar connection may be made between the throat section 103 and the expansion section 104 using the second lap joint adapter 120.

The connecting member or lap joint adapter may further include a flexible element capable of accommodating expansion of the connecting member or the lap joint adapter when the connecting member or lap joint adapter is heated. The flexible element may be a convoluted portion or overlapping portion or other structure capable of allowing expansion (or contraction) of the lap joint adapter without requiring similar expansion (or contraction) of the underlying thrust chamber sections to which it is welded. Alternatively the connecting member or lap joint adapter may include a material component, or variation of material properties, that provides such flexibility. The flexible element may provide a mechanism for allowing the absorption of any thermal expansion or size change mismatch between the thrust chamber sections and the lap joint adapter. This may be particularly important for the outer wall/exterior skin welds to the lap joint adapter as the inner wall/interior skin has already been welded and is thus relatively fixed and inflexible. The heat applied during the laser welding process may typically cause at least parts of the connecting member or lap joint adapter to expand and contract on cooling. Where no flexible element is included this can cause the rupture of the inner wall weld and/or a weaker outer wall weld. This may also be problematic as the heating may be localised to certain areas creating different rates of thermal expansion and subsequent contraction.

Figure 7:
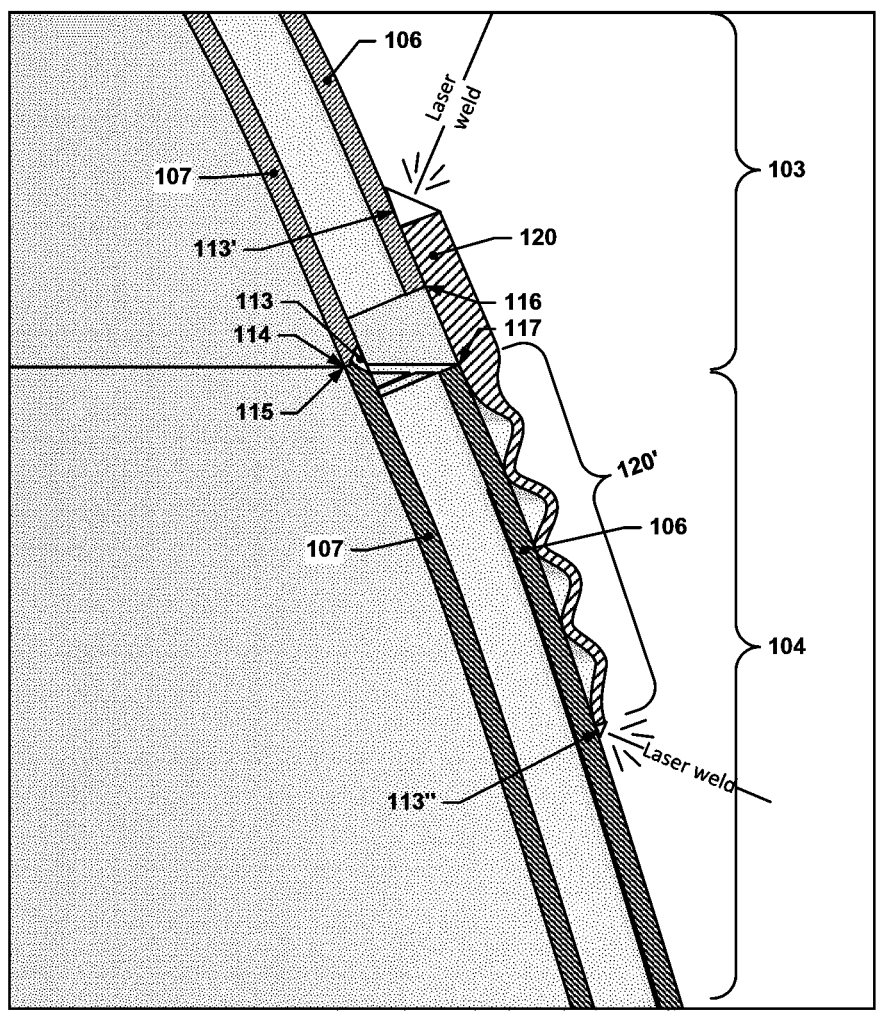
FIG. 7 depicts a detail side section view of an alternate lap joint adapter design.

FIG. 7 depicts a detail side section view of an alternate lap joint adapter design. In FIG. 7, the joint between the throat section 103 and the expansion section 104 is shown. The interior skins 107 of these two sections have been joined via the weld 113. As can be seen, the second lap joint adapter 120 in this example includes flexible element 120' that may allow for thermal expansion in the region between the two weld points 113' and 113".

Figure 8:
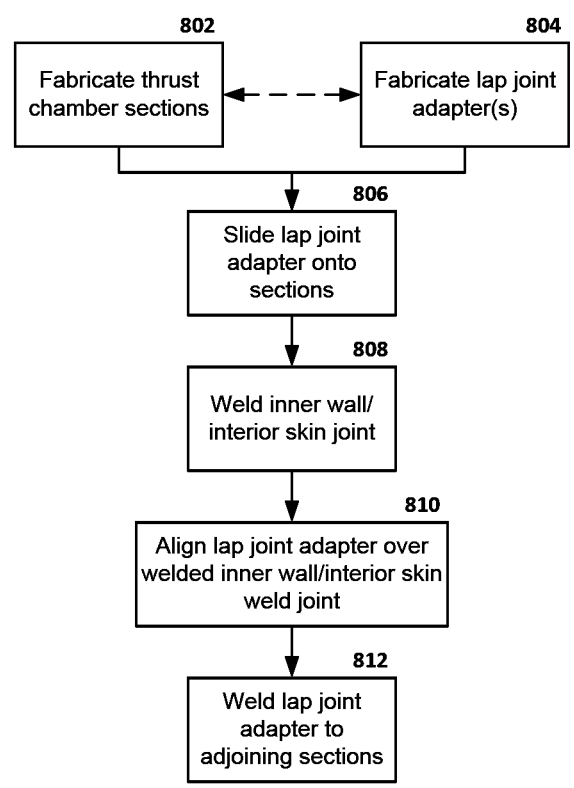
FIG. 8 shows a flow chart of the construction of a weld for the thrust chamber or other double-walled structure.

FIG. 8 shows a flow chart of the construction of a weld for the thrust chamber or other double-walled structure. The thrust chamber sections and the connecting member or lap joint adapter may be made separately or in a single fabrication process in steps 802 and 804, e.g., a thrust chamber section and a lap joint adapter may be made during the same additive manufacturing process in order to save time. When the thrust chamber is manufactured the inner wall or interior skin of each section may extend further than the outer wall or exterior skin of that section. For such implementations, when adjacent sections of the thrust chamber 101 are aligned, the inner wall or interior skin of each section will meet and the outer walls or exterior skin will be spaced apart so as to allow access to the inner wall/interior skin from the outside of the thrust chamber 101. The inner wall or interior skin can then be welded without requiring access inside the thrust chamber 101 in block 808. Prior to welding two sections together, the lap joint adapter for that joint may be slid onto the sections, if necessary, in block 806. This lap joint adapter or connecting member may then be positioned over the spaced apart region of the outer wall or exterior skin in block 810. In one implementation, the walls of the coolant flow passages 110 may not extend into the gap between the exterior skins of adjacent sections. It has been found that a small gap between the walls of the coolant flow passages 110 does not have a large effect on overall cooling performance. The lap joint adapter or connecting member is then welded or otherwise secured to each of the adjacent thrust chamber sections in block 812. A series of thrust chamber sections may thus be joined together using a series of similar welds. An advantage of this welding method is that the thrust chamber walls do not need to have an increased thickness in order to support a mounting flange or other type of connection, which would cause an increase in weight. The thrust chamber 101 also has a substantially smooth interior diameter across the weld location and no flange or similar connecting expansion in the diameter of the thrust chamber is required on the outside of the thrust chamber.

In some implementations, as discussed above, the lap joint adapter or connecting member is manufactured in the same process as at least one of the thrust chamber portions. This increases the speed of production as well as providing the ability to accurately match the size of the additional section. For instance, if the connecting member or lap joint adapter is formed with the same initial diameter as one end of a thrust chamber section and with an increasing diameter, it may be formed around the outside of the thrust chamber section in the same process. Once fabricated, the connecting member or lap joint adapter may be placed on one of the adjacent thrust chamber sections and slid along the central axis so that it is out of the way for the joining or welding of the inner wall or interior skin. After welding of the inner wall or interior skin is complete, the connecting member or lap joint adapter may be moved down to span the gap in the outer wall or exterior skin in the weld region. The size and shape of the connecting member or lap joint adapter may be used to ensure appropriate alignment of the thrust chamber sections. The lap joint adapter may be sized so that it sits in an appropriate place over the gap in the exterior skin based on its geometry. The lap joint adapter can then be welded into place, preferably at the top and bottom edges of the lap joint adapter.

The lap joint adapters or connecting members may form substantially cylindrical or frustoconical shapes, although some curvature may be present to accommodate curvature in the profile of the thrust chamber sections. The connecting members or lap joint adapters may be designed to be placed over a first section of the thrust chamber and when a second section, to be connected adjacent to the first section, of the thrust chamber is in place, to slide over the second section so as to bridge the welding point.

When welded together, the thrust chamber sections may form a unitary thrust chamber which has continuous inner and outer walls and is a single component to keep track of. The thrust chamber may have additional attachments either added or included during the manufacturing process, for example, mounting points for actuators to control the positioning of the thrust chamber. For example, in some implementations, two mounting points may be attached ninety degrees apart so as to allow movement of the thrust chamber in two directions.

FIG. 9 depicts a side view of a throat section of the example thrust chamber of FIG. 1. FIG. 10 depicts an isometric view of the throat section of the example thrust chamber of FIG. 1. These views serve to provide further insight as to how the weld interface areas of an example section may look, including the offset between the interior skin 107 edge and the exterior skin 106 edge.

The present inventors have also realized that enhanced cooling performance in the thrust chamber may be obtained by changing the surface roughness of the coolant flow passages 110 along the length of the coolant flow passages 110. For example, the surface roughness within the coolant flow passages 110 within the throat section 103 may be higher than the surface roughness within the corresponding coolant flow passages 110 in the barrel section 102 or the expansion section 104. The increased surface roughness in the throat section 103 may introduce at least two beneficial effects—it may induce more turbulent flow within the coolant that flows through the coolant flow passages, resulting in better heat transfer into the coolant, and it may also provide an increased surface area through which heat may flow into the coolant. Since the throat section 103 is typically where combustion temperatures are the highest, there is often increased heating of the thrust chamber 101 in the throat section 103. At the same time, the throat section 103 typically has the least amount of cross-sectional material in a plane perpendicular to the thrust direction, resulting in larger temperature rises in the throat section 103. By increasing the surface roughness of the coolant flow passages 110 within the throat section 103, increased cooling may be realized, which may help counteract the increased heat loading on the throat section 103.

At the same time, increasing the surface roughness within the coolant flow passages 110 will also result in a higher flow resistance and an increased pressure drop in the coolant flow passages 110 from the first end 111 to the second end 112 of the thrust chamber 101. Since an increased pressure drop would generally require increased pumping pressure in order to maintain the same coolant volumetric flow rate, such an increased pressure drop may also require a larger or more powerful pumping system, which may, in turn, increase the overall weight of the rocket, which then requires additional fuel or reduced payload capacity. In order to reduce the pressure drop effects, the surface roughness, as discussed above, may be lower in other sections of the thrust chamber 101. This may result in reduced heat exchange within those other sections, but may also result in a reduced pressure drop. Thus, by varying the surface roughness within the coolant flow passages 110, the pressure drop and heat transfer performance of the coolant flow passages 110 may be tuned so as to provide a desired heat transfer performance without undue pressure drop.

Controlling surface roughness of coolant flow passages 110 within traditional rocket engines is quite problematic due to how such engines are constructed; there is accordingly very little ability to control the surface finish within the coolant flow passages within such traditionally-made rocket engines since the interior surfaces of the passages are typically inaccessible after the coolant flow passages are formed.

In contrast, the use of additive manufacturing techniques to form the sections of a thrust chamber provides a relatively unique ability to control the surface finish of the coolant flow passages 110 as they are being formed. This ability exists on two levels—first, it is possible to design in small bump features, ridges, protrusions, valleys, etc. that serve to provide local variation in particular regions of a coolant flow passage 110. These features may be difficult or impossible to machine using traditional machining techniques due to an inability to easily access the feature area with a tool. Second, some additive manufacturing techniques may allow for different surface roughnesses to be created by changing the materials used to create various surfaces. For example, in DM LS, metal particles are deposited layer-by-layer and then selectively fused together to form a solid, sintered part. The particles typically used in DMLS processes may typically have average particle diameters that range between 30 μm and 110 μm, although DMLS processes are not limited to such a range.

Varying the surface roughness within the coolant flow passages may also provide increased heat transfer characteristics that may compensate somewhat for the thermal characteristics of the material used to form the sections of the thrust chamber 101. For example, it is common to use copper in traditional thrust chamber designs since copper generally has the highest heat transfer coefficient of metals that may be used to create thrust chambers; this helps maximize the amount of heat that may be transferred to the coolant through the thrust chamber skin. While DM LS processes are commerically available that allow DMLS parts to be made using titanium alloys (including $Ti_6Al_4V$), steel alloys (including stainless steel alloys and maraging steel alloys), and Inconel alloys (such as Inconel 625 or Inconel 718), DM LS processes that allow for the creation of sintered copper components are not yet proven or commercially available. This poses some difficulty, as these materials have thermal conductivities that are an order of magnitude or two less than that of copper—varying the surface roughness within the coolant flow passages can serve to compensate somewhat for the reduced thermal conductivity of these materials as compared with copper. It is to be understood, however, that when DM LS processes for making sintered copper components become available, there is no reason why the concepts disclosed herein, including the variation of surface roughness within the coolant flow passages, cannot be applied to sintered copper components made using additive manufacturing—such surface roughness variation would simply act to make the heat transfer through such a copper component more efficient.

It is to be understood that the variations in surface roughness discussed herein may generally describe variations between sections as a whole, e.g., the average surface roughness of the barrel section 102 may be 60 μm±15 μm throughout the entire section and the average surface roughness of the throat section 103 may be 120 μm±15 μm throughout the entire section; variations between portions of various sections, e.g., the average surface roughness of only a portion of the coolant flow passages 110 within the barrel section 102 may be 60 μm±15 μm and the average surface roughness of only a portion of the coolant flow passages 110 within the throat section 103 may be 120 μm±15 μm. It is also to be understood that surface roughness may be varied along the length of the coolant flow passages 110 in a variety of ways, including as a step function, such as when each section is made from particles having average particle diameters that are significantly different in size, or as a gradient function, such as may be obtained by changing the average particle diameters slowly over the course of manufacturing a section of the coolant flow passages (which may, in effect, be provided by a series of smaller step changes from one average particle diameter size to the next highest available average particle diameter size to the next highest available average particle diameter size, and so forth).

By way of one non-limiting example, a thrust chamber 101, such as is discussed above, may be manufactured using DM LS such that the average particle diameter of the particles used to make the barrel section 102 is 60 μm±20 μm, the average particle diameter of the particles used to make the throat section 103 is 120 μm±20 μm, and average particle diameter of the particles used to make the expansion section 104 is 30 μm±20 μm or 45 μm±20 μm. To provide some sense of relative roughness, per the standards used by the Federation of European Producers of Abrasives (FEPA), an average particle diameter of 30 µm is approximately the roughness of P500 grit sandpaper, an average particle diameter of 60 µm is approximately the roughness of P240 grit sandpaper, and an average particle diameter of 120 µm is approximately the roughness of P120 grit sandpaper.

In some implementations, the surface finish of at least a portion of one section may be defined relative to the surface finish of at least a portion of another section. For example, the surface finish of at least some portions of the coolant flow passages 110 in the throat section 103 may have a surface finish with a surface roughness that is 1.4 to 3 times rougher than the surface finish of at least some portions of the coolant flow passages 110 in the barrel section 102. Similarly, the surface finish of at least some portions of the coolant flow passages 110 in the throat section 103 may have a surface finish with a surface roughness that is 2.3 to 9 times, or 1.5 to 5.6 times, rougher than the surface finish of at least some portions of the coolant flow passages 110 in the expansion section 104.

In some implementations, the surface finish of at least a portion of one section may be defined relative to the surface finish of at least a portion of another section in terms of the relative average particle diameter used to make such portions. For example, the average particle diameter of metal particles used in making at least some portion or portions of the sintered metal structure of the throat section that define the coolant flow passages 110 may be between 1.8 and 2.2 times larger than the average particle diameter of metal particles used in making at least some portion or portions of the sintered metal structure that define the coolant flow passages 110 of the barrel section, or 3.6 to 4.4 times rougher than the average particle diameter of metal particles used in making at least some portion or portions of the sintered metal structure that define the coolant flow passages 110 of the expansion section, thereby resulting in a different surface roughness between at least two portions of one or more of the coolant flow passages 110.

DMLS also offers other mechanisms for altering surface roughness which may be used to achieve the desired surface roughness characteristics for the thrust chamber 101 sections. For example, a laser is typically used in DMLS to fuse together the metal particles and form the sintered metal structure. By controlling the border of the laser, i.e., the outer edge of the laser target area, it is possible to change the heat in the weld pool on the outer edge of the area that the laser is processing. The more heat that is present, the better the weld and the smoother the surface finish. When there is less heat present, the particles will not be fused as fully and will present a rougher surface finish. Thus, when processing portions that are to have rougher surface finishes, the intensity of the laser used in the DMLS process may be adjusted so as to have a reduced intensity as compared with the intensity used for portions having smoother surface finishes. This technique may be easier to implement since it only involves altering the laser intensity of the DMLS laser, which is a parameter that may be controlled in commercially-available DMLS tools, as opposed to physically changing the particle diameters used.

The additive manufacturing techniques discussed above with respect to the manufacture of the thrust chamber also may be applied, as mentioned earlier, to the manufacture and design of injectors to be used with such thrust chambers.

Figure 13:
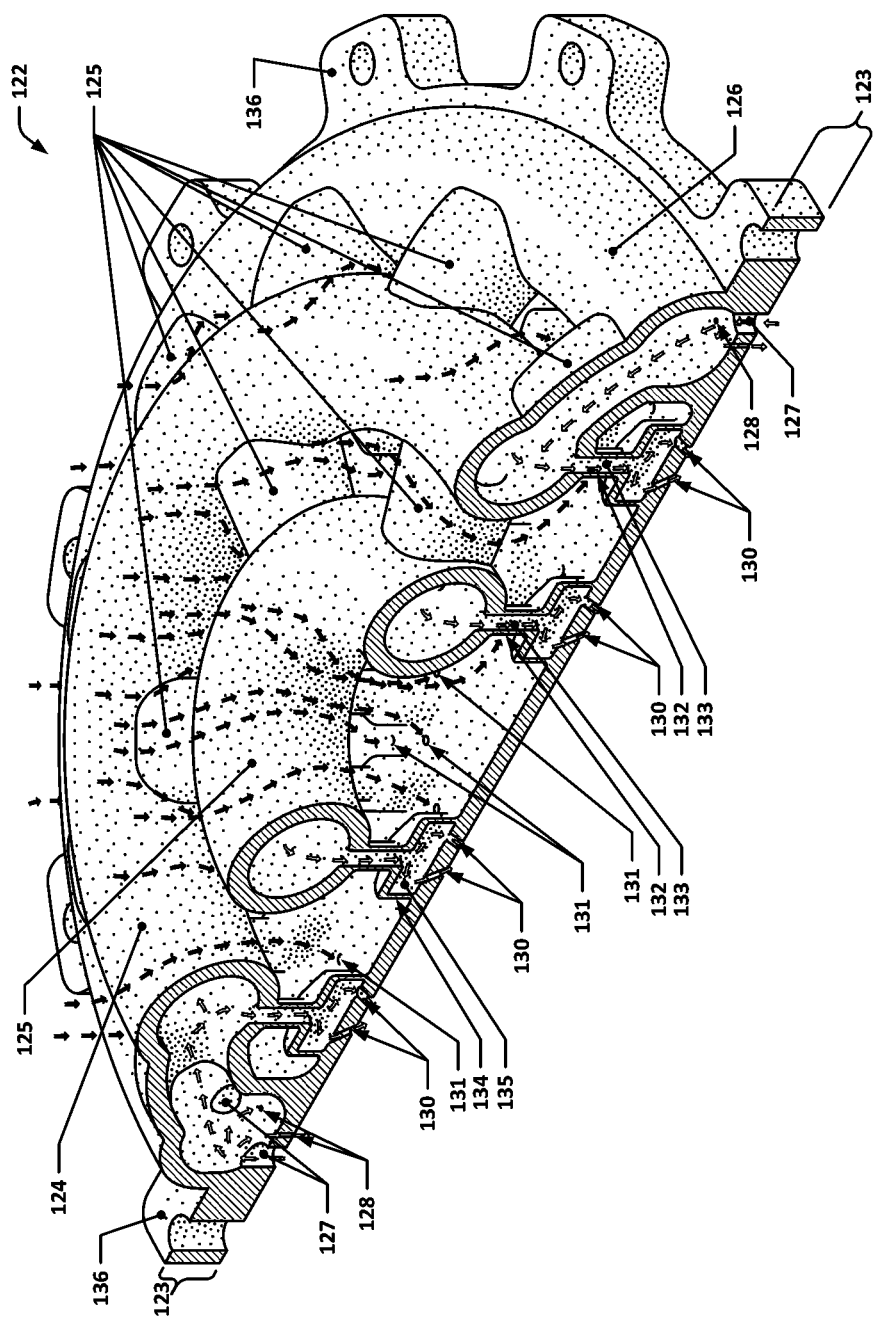
FIG. 13 depicts an isometric side section view of the injector of the example thrust chamber of FIG. 1.

FIG. 11 depicts an isometric view of the injector of the example thrust chamber of FIG. 1. FIG. 12 depicts an isometric cutaway view of the injector of the example thrust chamber of FIG. 1. FIG. 13 depicts an isometric side section view of the injector of the example thrust chamber of FIG. 1.

The injector 122 may generally include a plurality of concentric annular plenums, such as a first annular plenum 124 and a second annular plenum 125. An annular propellant distribution plenum 126 may encircle the annular plenums; the annular propellant distribution plenum 126 may include a number of propellant inlet ports 127 that receive propellant from the coolant flow passages 110 in an attached thrust chamber 101; the thrust chamber 101 may be connected with the injector 122 via a mounting flange 136, which may provide releasable connection points for joining the injector 122 to the thrust chamber 101, as well as to other components.

The injector may also include a number of radial passages 129 that fluidically connect each annular plenum with any adjacent annular plenum(s) or with the annular propellant distribution plenum (if adjacent to that annular plenum). Generally speaking, the radial passages 129 fluidically connecting each annular plenum with any adjacent annular plenum(s) may be arranged in evenly-spaced, circular arrays about the inner diameter and/or outer diameter of the annular plenum. In some implementations, the number of radial passages 129 that are fluidically connected with an annular plenum along the annular plenum's inner diameter may be half of the number of radial passages 129 that are fluidically connected with the annular plenum along the annular plenum's outer diameter. In such implementations, each radial passage 129 that is located along the annular plenum's inner diameter may be approximately equidistant from the two closest radial passages 129 that are located along the annular plenum's outer diameter.

It is to be understood that while the annular plenums that are depicted in the accompanying Figures are generally toroidal in shape, i.e., having a shape generally defined by revolving a circular cross-section about a non-intersecting center axis, the term "annular plenum" is intended to embrace other, similar shapes that are not necessarily toroidal. For example, instead of a plenum that follows a circular path around the center of the injector 122, the plenum may follow a polygonal path, e.g., a 12-sided polygon path. Alternatively, or additionally, the cross-section of the annular plenum through a plane that is parallel to and intersects with the center axis of the injector 122 may not be circular, as is the case with the depicted implementation, but may be polygonal or otherwise have a non-circular shape. It is to be understood that the term "annular plenum" is intended to embrace the implementation shown as well as other implementations of these plenums, as described above.

As can be seen more clearly in FIG. 13, the annular plenums, such as the first annular plenum 124 and the second annular plenum 125, may be offset from a base plate 123 that provides a boundary surface for the barrel section 102 when the injector 122 is attached to the thrust chamber 101. A plurality of support columns 132 may span between the first annular plenum 124 and the base plate 123 as well as between the second annular plenum 125 and the base plate 123. Each support column 132 may include a riser passage 133 that is fluidically connected with the annular plenum from which that support column 132 spans. In some implementations, each support column 132 also may include a column base 134 that encloses a base plenum 135. The base plenum 135 may have a cross-sectional area in a plane parallel to the base plate 123 that is considerably larger than the cross-sectional area of the remainder of the support column 132 in a corresponding parallel plane.

Generally speaking, the injector 122 may be used with bi-propellant systems to provide two different propellants to the thrust chamber 101 while keeping these propellants separated from one another until after they are introduced into the thrust chamber 101. One of the two propellants may be contained within the annular plenums and the annular propellant distribution plenum 126 and then directed through the base plate 123 via first propellant ports, such as first angled propellant ports 130; such a propellant may, for example, be kerosene or other combustible fuel that is first flowed through the coolant flow passages 110 in the thrust chamber 101 before being introduced into the annular propellant distribution plenum 126. The other propellant, which may, for example, be an oxidizer, may be flowed past the annular plenums and the annular propellant distribution plenum, e.g., the other propellant may completely occupy the "free" volume surrounding these plenums. A cap, such as cap 105, may define this free volume in conjunction with the base plate 123.

FIG. 12 depicts an isometric cutaway view of the injector of the example thrust chamber of FIG. 1. This view may serve to better illustrate some of the fluid flow within the injector 122. As can be seen, a first propellant (indicated by white arrows) may flow into the annular propellant distribution plenum 126 through a circular pattern of propellant inlet ports 127. The first propellant may be provided to the propellant inlet ports 127 by, for example, the barrel section 102 of a thrust chamber 101. The first propellant may flow into the annular propellant distribution plenum 126 before flowing into the radial passages 129 that fluidically connect the annular propellant distribution plenum 126 with the first annular plenum 124. In some implementations, a circular array of film cooling orifices or drip orifices 128 may be provided to allow a small fraction of the first propellant that is introduced into the annular propellant distribution plenum to be diverted so as to flow down the inside surface of the barrel section 102 to form a drip film, where the diverted propellant may evaporate from the heat of combustion and form a thin, gaseous insulating layer that may reduce heat transfer from the combustion products to the interior skin 107 of the barrel section 102.

The drip orifices 128 may be formed by a plurality of apertures or conduits through the base plate 123 or, alternatively, through a rib projecting out from the interior skin 107 that supports the injector 122. The apertures may be sized so that the ratio between propellant forming the drip film and propellant passing through the injector is at a desirable level. A typical ratio may result in a range of 5-15% of the propellant flowing into the injector 122 being diverted to form the drip film. The apertures may be cylindrical holes, although other types of apertures may be used for the drip orifices.

As noted above, in some implementations, the support columns 132 may each include a base plenum 135 that include two first angled propellant ports 130. Each pair of first angled propellant ports 130 may be angled such that propellant that is jetted through the paired ports passes through the base plate 123 and intersects at a location within the barrel section 102. The paired first angled propellant ports 130 may be arranged in concentric circular arrays. In many implementations, each circular array of paired injector ports may have a nominal pattern diameter that is within the inner and outer diameters of the annular plenum that feeds those respective paired first angled propellant ports 130.

The first angled propellant ports 130 may be single (in some such implementations, the first propellant ports may not be angled at all), but are preferably arranged in doublets. The first angled propellant ports 130 may be angled such that the liquid constituents or propellant passing through them will intersect beyond the side of the base plate 123 opposite the support columns 132 and atomize within the barrel section 102, improving the mixing of the propellants. In the depicted implementation, the doublets are shown as self-impinging, e.g., the same propellant passes through each doublet, although cross-impinging, where different propellants pass through each aperture of a doublet, is also an alternative. The angle and spacing of the first angled propellant ports are arranged so as to control the distance from the base plate 123 at which the self- or cross-impinging propellants will meet. In some implementations, each angled propellant port in a doublet has the same angle relative to a central axis perpendicular to the plane of the base plate 123 so that the impinging occurs in a balanced matter, e.g., without becoming askew or moving substantially away from the central axis.

The base plate 123 may also have second propellant ports, such as second angled propellant ports 131, that are arrayed in corresponding circular arrays. For example, the injector 122 may include a plurality of paired second angled propellant ports 131, similar to the first angled propellant ports 130, that are arrayed in circular arrays such that each pair of second angled propellant ports 131 is interposed between adjacent pairs of the first angled propellant ports 130. The second angled propellant ports 131 may be in direct fluidic communication with the free volume surrounding the annular plenums, allowing the second propellant that is introduced into the free volume to pass through the second angled injector ports 131 to pass into the barrel section 102, where it may intermix with the first propellant and be combusted.

Figure 14:
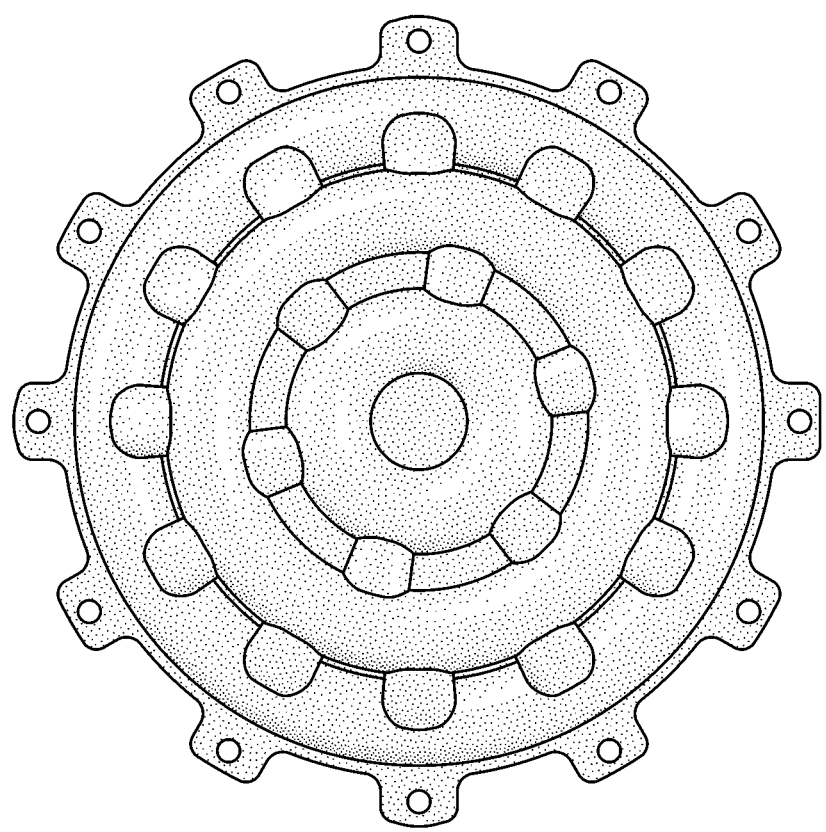
FIG. 14 depicts a plan view of the injector of the example thrust chamber of FIG. 1.
Figure 15:
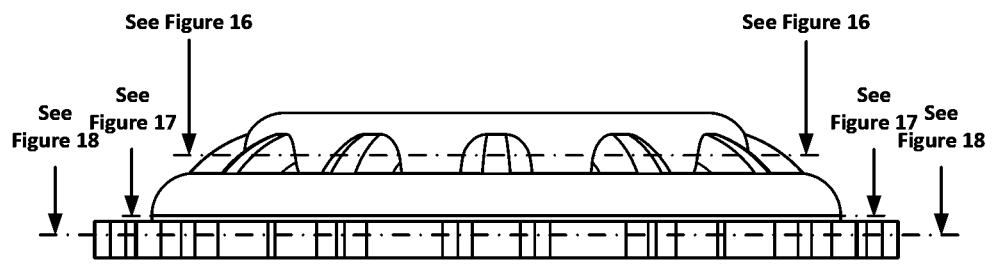
FIG. 15 depicts a side view of the injector of the example thrust chamber of FIG. 1.

FIG. 14 depicts a plan view of the injector of the example thrust chamber of FIG. 1. FIG. 15 depicts a side view of the injector of the example thrust chamber of FIG. 1. FIG. 15 indicates three separate section lines that indicate the locations of section planes used to create FIGS. 16, 17, and 18, each of which depicts a different section view of the injector 122.

Figure 16:
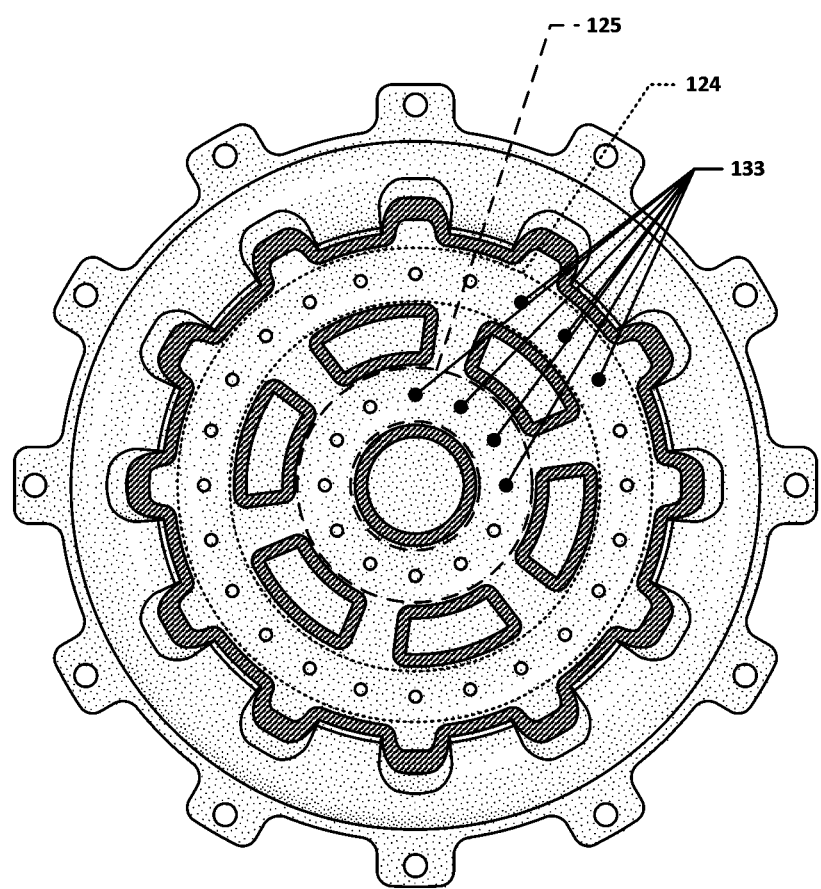
FIG. 16 depicts a section view of the injector of the example thrust chamber of FIG. 1.

As can be seen in FIG. 16, the first annular plenum 124 (indicated by the dotted lines) and the second annular plenum 125 (indicated by the dashed lines) are fluidically connected by the radial passages 129 spanning between them. As can be further seen, the first annular plenum 124 and the second annular plenum 125 each have a circular array of riser passages 133 that allow propellant flowing through the first annular plenum 124 and the second annular plenum 125 to flow into the support columns 132 that support the first annular plenum 124 and the second annular plenum 125.

Figure 17:
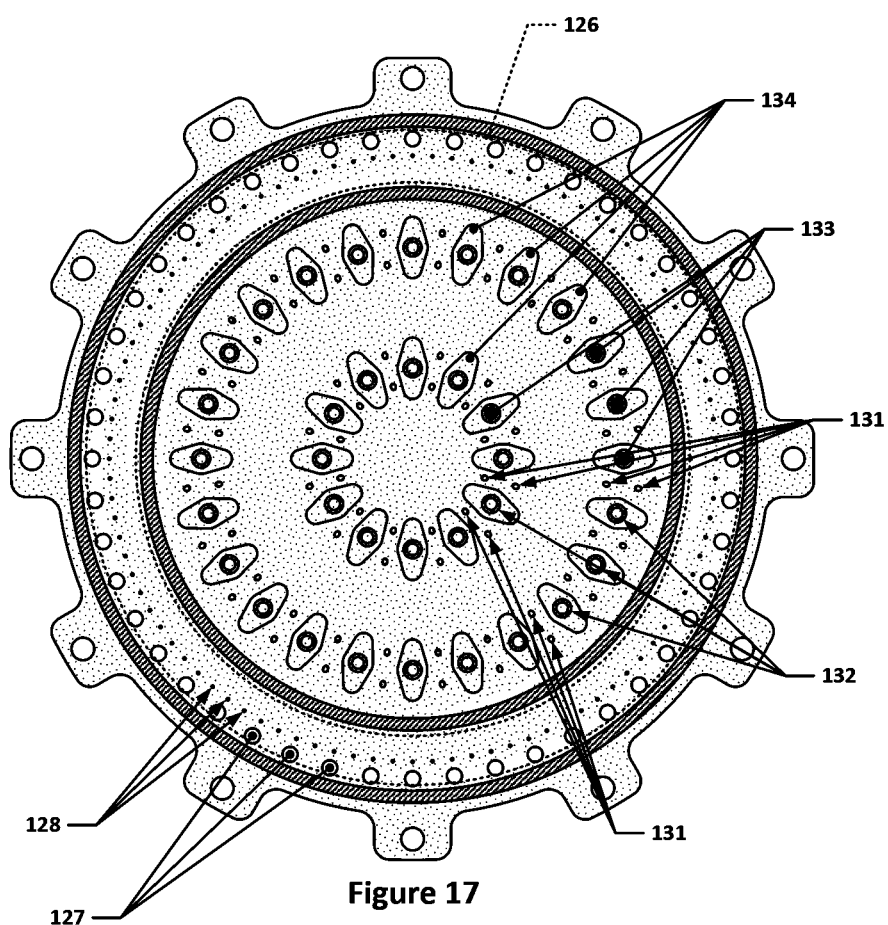
FIG. 17 depicts another section view of the injector of the example thrust chamber of FIG. 1.

As the propellant flows into the riser passages 133, it may flow towards the base plate 123. FIG. 17 depicts a cross section of the injector 122 at an elevation that is closer to the base plate 123. As can be see, there are two circular arrays of support columns 132, and each such circular array is located underneath, when looking towards the injector 122 along a direction normal to the base plate 123 and from a viewpoint located on the same side of the base plate as the first annular plenum 124, one of the first annular plenum 124 and the second annular plenum 125. Also visible in FIG. 17 are a plurality of column bases 134, each of which is associated with a different one of the support columns 132.

A number of holes passing through the base plate 123 are also visible in FIG. 17. For example, two circular arrays of paired second angled propellant ports 131 can be seen; each pair of the second angled propellant ports 131 may be located between adjacent column bases 134. In addition, the annular propellant distribution plenum 126 is also visible in FIG. 17, and may have a series of propellant inlet ports 127 arranged in a circular pattern, as well as a circular array of drip orifices 128.

Figure 18:
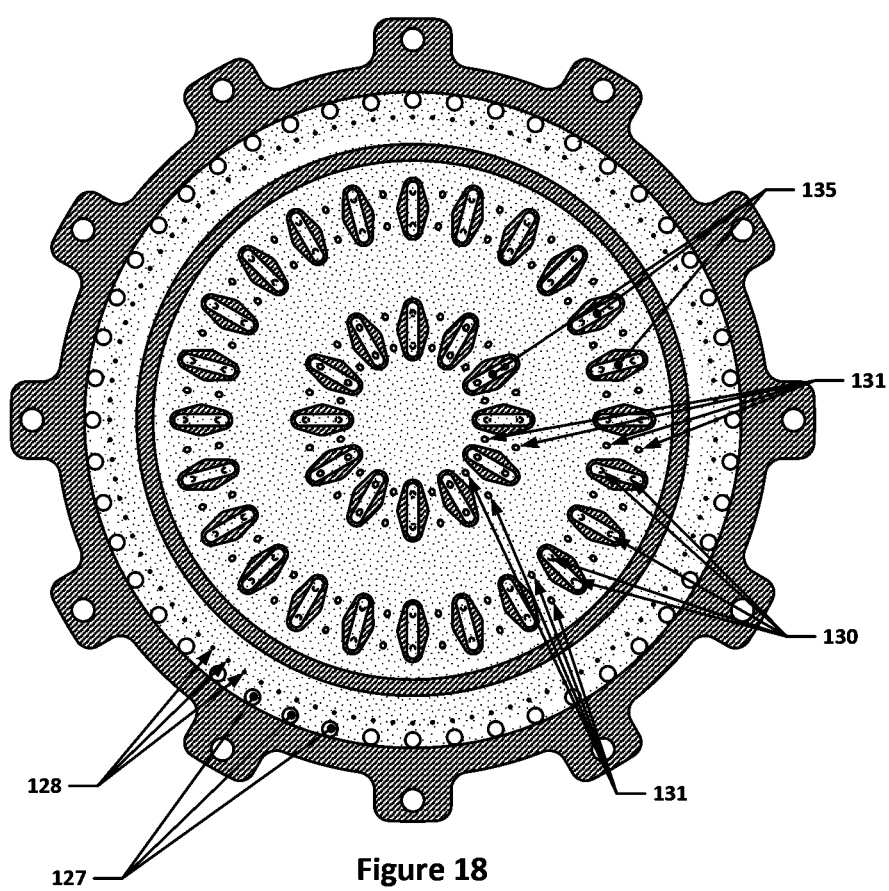
FIG. 18 depicts yet another section view of the injector of the example thrust chamber of FIG. 1.

As can be seen in FIG. 18, as the propellant approaches the base plate 123, the riser passage 133 of each support column 132 may widen into a base plenum 135, which routes the propellant to, in this example, two first angled propellant ports 130. Each of the pairs of the first angled propellant ports 130 are thus located in between two adjacent pairs of the second angled propellant ports 131.

It is to be understood that variations on the above-described injector are considered to be within the scope of this disclosure. For example, injectors made according to this disclosure may include more than two annular plenums, such as three or four annular plenums. Other variations may include, but are not limited to, omission of the drip orifices, use of non-circular ports, use of single instead of paired propellant ports, etc.

To give some sense of scale, it is noted that the injector 122 may be on the order of six inches in nominal diameter. However, the concepts discussed herein may be applicable to rocket engines of any size or scale, and this disclosure is not be understood as being limited to only the scale of the depicted implementation.

As noted earlier, the propellants for the rocket engine may be fed to the injector 122, either relatively directly or by first being pumped through the coolant flow passages 110 of the thrust chamber 101, by one or more turbopumps. Gas-driven turbopumps have traditionally been used in rocket motors to deliver propellants to the injectors at a sufficiently high enough flow rate to sustain the high combustion rates of rocket motors. The present inventors determined that electrically-driven turbopumps powered by batteries or other electrical power sources provided a superior fuel delivery system for a rocket engine. In such implementations, the complicated valving and plumbing needed to drive a gas-driven turbopump is eliminated in favor of a controllable electrical motor, which allows for much more precise and responsive individual control of propellant pumping rates. This, in turn, allows the mixture of propellants introduced into the thrust chamber 101 to be varied in real-time in order to attain optimal combustion of the propellants.

Figure 19:
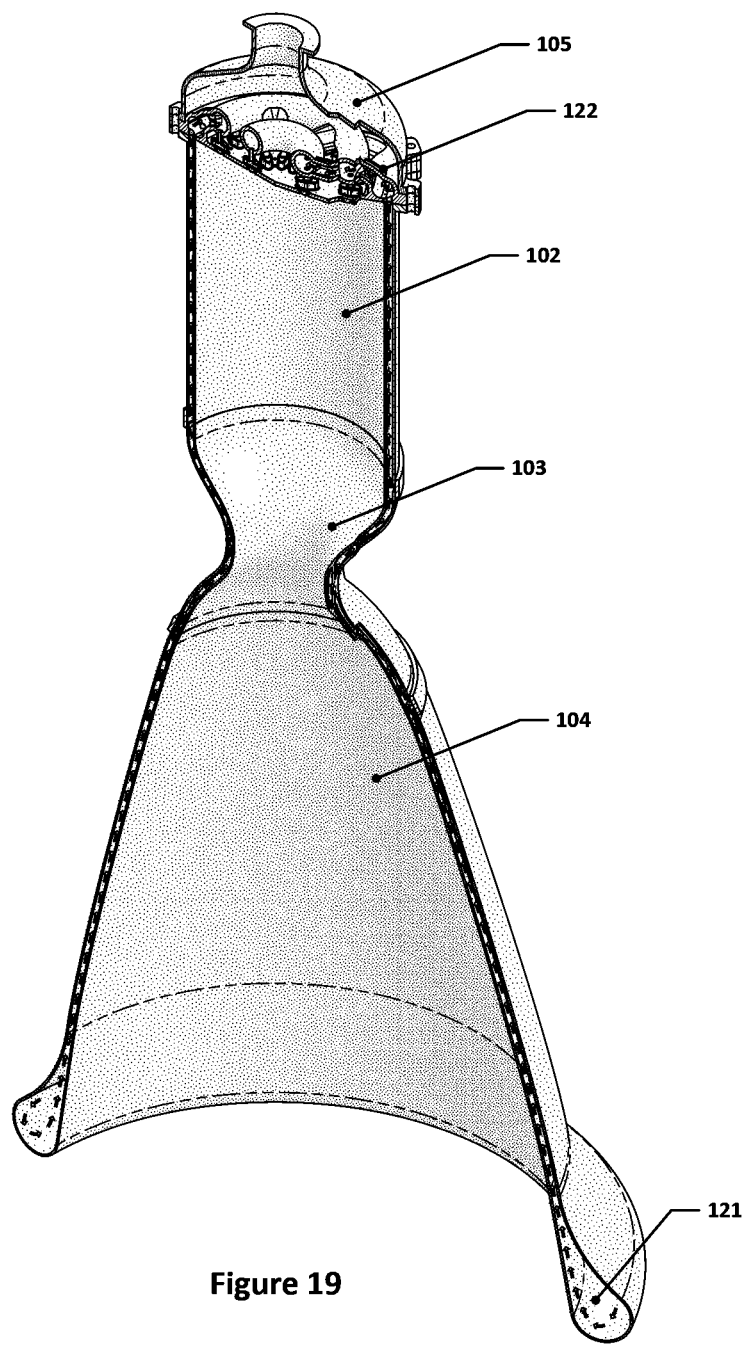
FIG. 19 depicts an isometric cutaway view of the example rocket engine of FIG. 1.
Figure 20:
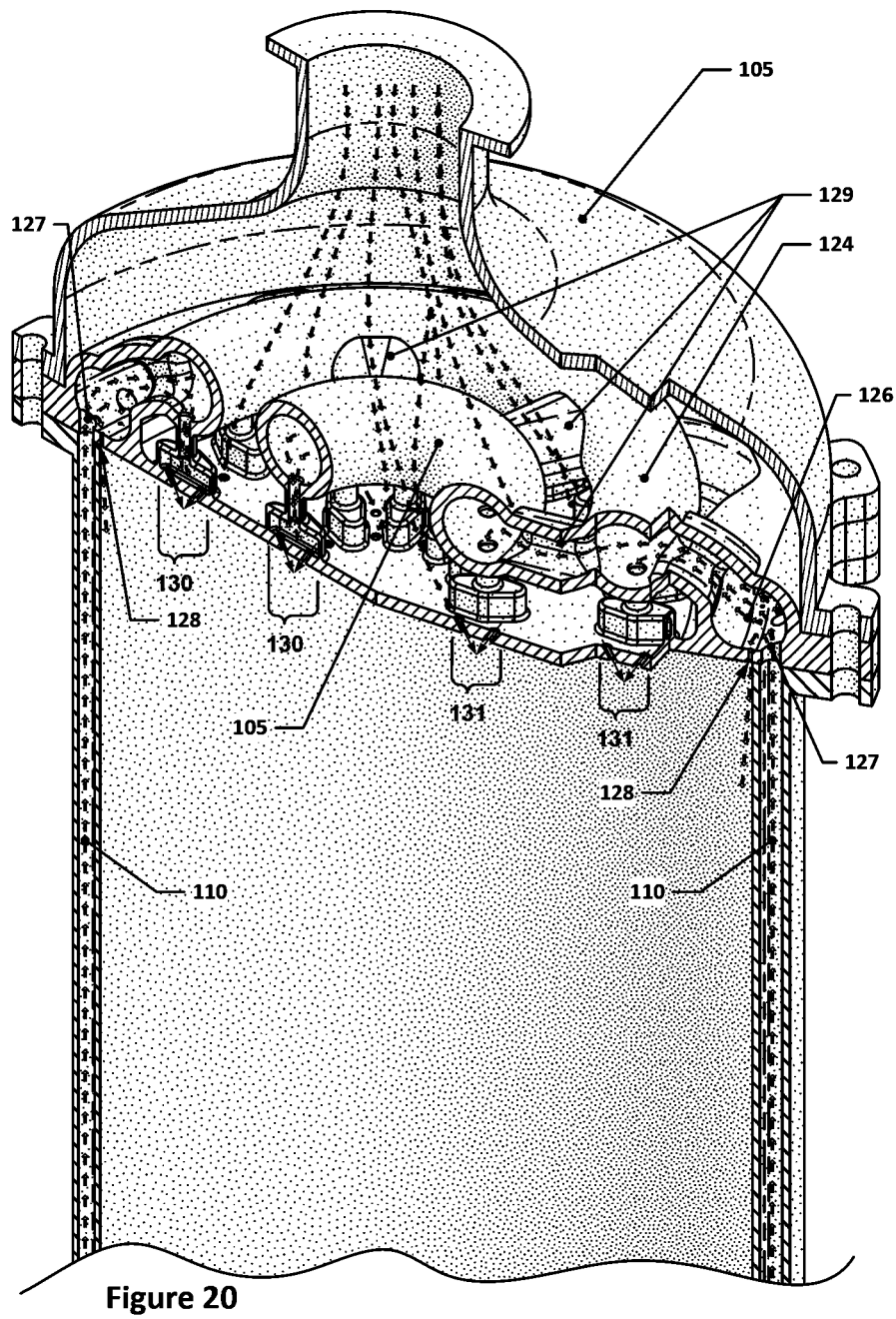
FIG. 20 depicts a detail view of the isometric cutaway view of FIG. 19.

FIG. 19 depicts an isometric cutaway view of the example rocket engine of FIG. 1; FIG. 20 depicts a detail view of the isometric cutaway view of FIG. 19. The rocket engine of FIG. 19 has been cut along a non-planar profile such that the section passes through various fluid pathways internal to the injector 122 and the thrust chamber 101.

FIGS. 19 and 20 depict the injector 122 mounted at the top of the thrust chamber 101. The injector 122 is positioned so as to allow the flow of a first propellant (white arrows) and a second propellant (black arrows) into the thrust chamber 101 and create a desired dispersion of the propellants in the thrust chamber 101 to allow suitable oxidation and combustion. The injector 122 may thus cause the atomization of the first and second propellants in the thrust chamber 101 to improve performance. The injector 122 may be bolted or otherwise releasably secured, or permanently secured, to the thrust chamber 101, although the injector 122 may be otherwise connected to, or an integral part of, the thrust chamber 101 in other embodiments.

The injector 122 may provide a mechanism for the first propellant and the second propellant, preferably liquid constituents, to enter the thrust chamber 101 for reaction/combustion. In a typical injector 122, the first and second propellants are a fuel, such as kerosene, hydrogen, and/or methane, and an oxidizer, such as liquid oxygen (LOx). Although fuel and oxidizer are used herein it should be understood that a broader range of propellants are known and may be used with the injector 122. The first and second propellants may be kept separated until they reach the thrust chamber 101 to avoid premature combustion/oxidation. In some implementations, the fuel may be used in a regenerative cooling system of the thrust chamber 101 before entering the combustion chamber or barrel section 102. In some implementations, such as the one pictured in FIG. 20, the fuel may enter the injector 122 from the thrust chamber 101 via the propellant inlet ports 127. As the thrust chamber 101 is beneath the injector 122, the fuel in such implementations may enter the injector 122 from below the injector 122 and the oxidizer may enter the injector 122 from above the injector (with reference to the orientation of FIG. 20).

The operation of the injector 122 may be understood by considering the flow paths of propellants through the injector 122. The first propellant may enter a pipe network that is provided by the combination of annular plenums and radial passages. This pipe network may include a series or network of conduits or passages that allow the flow of propellant along one or a plurality of paths. Preferably the pipe network forms a plurality of regions in which a common or balanced pressure can be maintained; the regions are preferably formed by the geometry of the pipe network. To ensure a balanced flow, the propellant inlet ports or entrances will typically be from a supply which encircles the pipe network. In the embodiment shown in FIG. 20, the supply is from an annular propellant distribution platform supplied by a flow of propellant from the coolant flow passages 110 of the thrust chamber 101 regenerative cooling system, although other supply techniques for the first propellant are also contemplated. The first propellant then flows across the radial passages 129, which bridge or connect each annular passage in the pipe network. The first propellant may then flow down the support columns 132 and into the base plenums 135 (not separately called out in FIG. 20; see earlier Figures).

From each base plenum 135, a pair of first angled propellant ports 130 may cause the first propellant to be expelled through the base plate 123. The first angled propellant ports 130 may be angled so that the first propellant passing through them intersects evenly at a location offset from the side of the injector 122 facing the barrel section 102. After an initial transient, the pressure of the first propellant at each of the first angled propellant ports 130 will equalize and is preferably balanced around the circumference of each circular pattern of propellant ports.

In contrast, the second propellant may flow around the pipe network, i.e., around the exterior walls of the structure defining the annular plenums and the annular propellant distribution plenum. Preferably the inlet, which may, for example, be such as is provided by the cap 105, mounts to the top of the injector 122, allowing the second propellant to be delivered across the diameter of the base plate 123. Therefore, the flow path of the second propellant is more direct than the flow path of the second propellant, flowing from above the base plate 123 and pipe network, around the pipe network, and then through the second angled propellant ports. The pipe network may be arranged so that a plurality of flow paths exists around the pipe network for the first propellant, providing few restrictions to the flow of the second propellant and enabling a constant pressure of the second propellant at the second angled propellant ports. This avoids a need to create a second distribution or pipe network for the second propellant.

As mentioned earlier, the doublets of propellant ports are arranged to allow balanced impinging of the streams of propellants; it may thus be desirable to have a common pressure at each of the riser passages 133 that feeds each base plenum 135. This may be particularly important for doublets supplied by annular plenums, as there may be differences in the length of flow and the annular plenums that the first propellant must pass through prior to reaching the first angled propellant ports 130. A common pressure may be achieved using the base plenum 135 to supply both first angled propellant ports 130 of the doublet in the base plenum 135. The base plenum 135 may act as a common source or conduit for both first angled propellant ports 130, providing equal pressure for both ports. In the implementation shown, the pipe network for the first propellant is in the form of a pipe network that is spaced apart from the base plate 123. The space between the pipe network and the base plate 123 allows the second propellant to flow around the conduits or pipes and access the second angled propellant ports 131 that may be located around and/or underneath the pipe network. This allows placement of the propellant ports in the best locations for propellant mixture. This is because the pipe network and plurality of base plenums 135 only affect a small area of the base plate 123 around the propellant ports, and the second propellant is thus able to flow at a substantially constant pressure to the propellant ports located close to these areas.

The pipe network may be connected to an annular propellant distribution plenum 126 to receive the first propellant. The pipe network, in this example, has a first annular plenum 124 with 24 support columns 132 and a second annular plenum 125 with 12 support columns 132, each of which connects with one of the base plenums 135. In the depicted implementation, the support columns are substantially vertical to reduce length, although variation of the angle is possible, e.g., the support columns may be angled to allow the second angled propellant ports to be located at a location other than a location centered underneath the annular plenum to which they are connected. The pipe network may be connected to the annular propellant distribution plenum 126 in any suitable position or positions, for instance a connection from the top or side is possible. The depicted implementation has an annular propellant distribution plenum 126 positioned towards the outside edge and at the bottom of the injector 122 so that the first propellant may flow directly from a regenerative cooling system of the thrust chamber 101 into the annular propellant distribution plenum 126. The annular propellant distribution plenum 126 may extend around the perimeter of the injector and may have a series of apertures, such as the propellant inlet ports 127, to allow the first propellant to flow into the pipe network. The outer edge of the injector 122 may, as noted earlier, have a series of mounting points with bolts or other releasable connection mechanisms for securing the injector 122 to the thrust chamber 101 appropriately. The mounting points may be positioned on a flange, for example. The flange may also provide an inlet to the pipe network—for example, the flange may provide a wall or surface that, when the injector 122 is assembled to the thrust chamber 101, defines a portion of the annular propellant distribution plenum 126. In some implementations, each two adjacent support columns 132 may have an arch spanning between them to support the pipe network between the support columns 132. The arch may provide support to the pipe network, particularly during fabrication, and may increase the strength of the unit without obstructing flow of the second propellant.

The injector 122 may be fabricated using additive manufacturing or 3D printing technologies. A laser sintering process using, for instance, titanium may be used to create the injector 122. The injector 122 may, in some implementations, be a unitary structure, requiring no connections between parts. This provides strength and reliability to the injector 122. The laser sintering process can result in a rough surface on the finished product. This rough surface can be abrasively removed or cleaned. However, in some implementations, the rough surface may be maintained in the first and second angled propellant ports as this creates a flow through the propellant ports that improves the atomization resulting from each doublet, as turbulence in the propellant flow due to the surface roughness may assist the atomization when the propellant streams impinge. The angled propellant ports may also have filleted or chamfered openings, at least on a first side of the base plate 123, preferably the top side facing the pipe network, to improve the flow of propellant into the ports.

Although the injector concept disclosed herein has been described with reference to a two-propellant system, the concepts herein may also be applied to a multi-propellant, i.e., more than two propellants, system by the addition of further annular plenums/support columns/propellant ports that are fluidically isolated from the first and second annular plenums. The propellants provided to the injector may be any liquid constituents that are capable of flow through the propellant ports, including gels, sols, and mixtures.

In tandem with developing the concepts for injectors and thrust chambers discussed above, the present inventors also conceived of a new turbopump design that allows, for example, for ~70 horsepower of pumping power to be provided from a turbopump approximately the same size as a soft drink can and that operates at approximately 40,000 RPM. Such a turbopump may be powered for approximately five minutes during a typical rocket flight, and may, accordingly, generate a significant amount of heat. The present inventors determined that a new approach to turbopump cooling could provide significant performance enhancements for such turbopumps.

Figure 21:
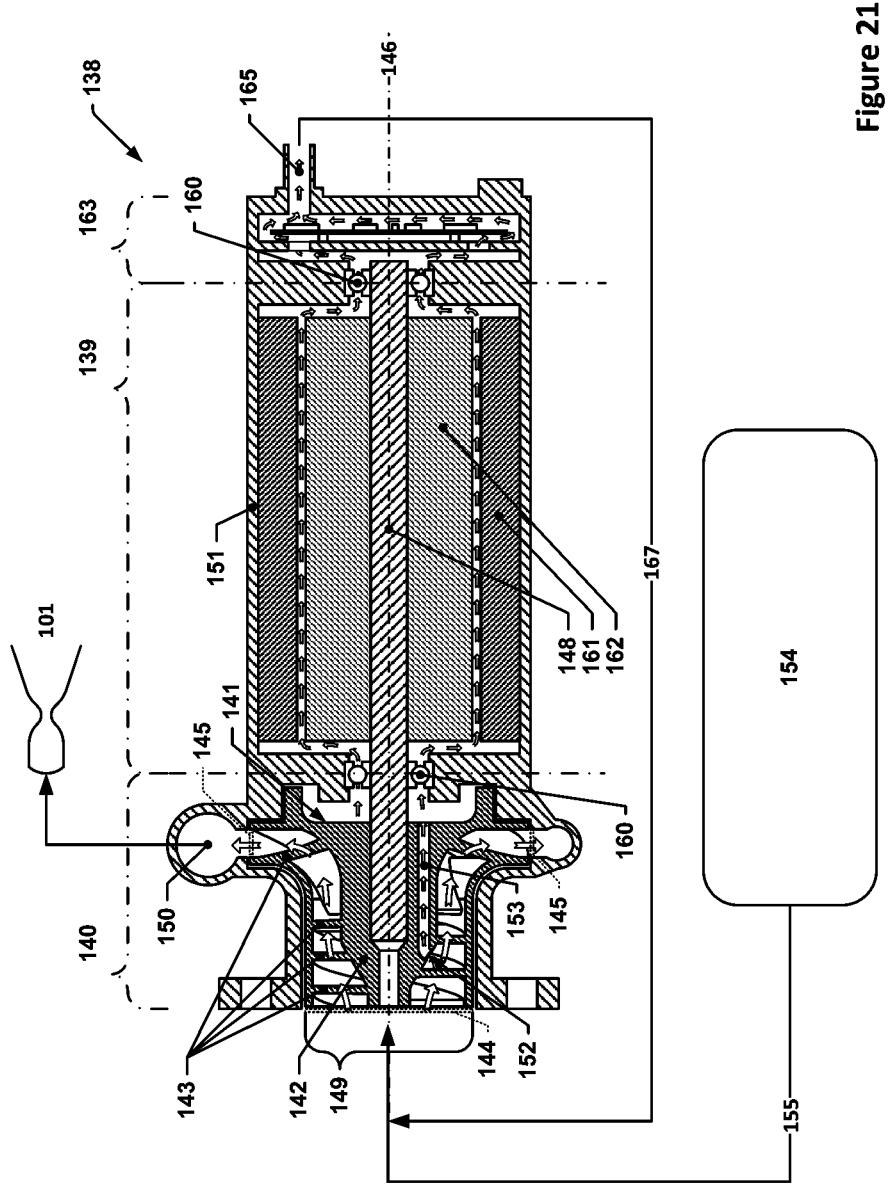
FIG. 21 depicts a simplified diagram of an example electrically-driven turbopump with integral cooling and various other components.

FIG. 21 depicts a simplified diagram of an example electrically-driven turbopump with integral cooling connected with various other components. As can be seen, the turbopump 138 may have a pump 140 that is driven by a motor 139; the pump 140 and the motor 139 may be housed within a housing 151, which is illustrated in simplified form. In actual practice, the housing 151 may be made from one or more components that are then fastened together in some manner to allow the internal components of the turbopump 138 to be installed, although in this view the housing 151 is drawn as a single, contiguous piece.

The pump 140 may include an impeller 141 that is rotatably connected with the motor 139 via a shaft 148. The shaft 148 may be supported within the housing 151 by bearings 160, and a rotor 162 of the motor 139 also may be supported by the shaft 148. The housing also may support the stator 161 of the motor 139. Electronics 163 may provide control electronics, power conditioning, etc., for the control of motor 139. In this implementation, the electronics 163 are located within the housing 151, although in other implementations, the electronics 163 may be located elsewhere.

The impeller 141 of the pump 140 may have a spindle or central hub 142 that has a plurality of vanes 143 arranged in an evenly-spaced circular array about a central axis 146.

These vanes 143 may follow somewhat helical paths about the central axis 146, and may, depending on the particular style of impeller used, have varying pitch and other characteristics. The impeller 141 may have an impeller inlet 144 that may serve as the turbopump inlet 149, as well as an impeller outlet, which, in the depicted example, directs fluid from the impeller 141 into a turbopump outlet 150 that wraps around the impeller 141. The turbopump outlet 150 in this example is C-shaped, and is fluidically connected with the impeller outlet 145 about the interior circumference of the C-shape.

The turbopump 138 may be supplied with propellant from a propellant tank 154 via a feed line 155. The turbopump outlet 150 may then supply the propellant that is pressurized by the turbopump 138 to the thrust chamber 101.

The impeller 141 may include a plurality of coolant bypass ports 152 that are each fluidically connected with a coolant passage 153 that passes through the central hub 142 and allows some of the propellant that is acted on by the impeller 141 to bypass the impeller outlet 145 and instead be flowed into the housing 151 so that the diverted propellant may be used to cool the various components housed within the housing 151, such as the bearings 160, the stator 161, the rotor 162, and the electronics 163. The coolant bypass ports 152 may be evenly spaced about the circumference of the central hub 142 to evenly balance the impeller 141 and prevent vibration in the impeller 141 at high rotational speeds. The coolant bypass ports 152 may be located at a range of different locations within the impeller 141, depending on the coolant pressure that is desired. As the coolant bypass ports 152 are moved closer to the impeller outlet 145, the pressure at the coolant bypass ports 152 may increase—thus, to provide increased pumping pressure for the propellant that is used as coolant, the coolant bypass ports 152 may be positioned to be closer to the impeller outlet 145.

Generally speaking, the coolant passages may maintain a constant distance from the central axis 146 so that the propellant flowing through the coolant passages is not subjected to centrifugal acceleration that may act to drive the propellant back towards the impeller, although in some implementations, the coolant passages 153 may be angled or otherwise follow a path that varies in distance from the central axis 146 so that centrifugal acceleration may actually act to draw the propellant through the coolant passages 153 and towards the motor 139. The coolant passages 153 may also follow paths that are helical or helical spirals within the central hub 142; such complex geometries are a unique option that is enabled when additive manufacturing is used to make the impeller 141.

The diverted propellant that is used as coolant may flow through various openings within the housing 151, or through openings in various other components, such as between the races of bearings 160, and enter the motor cavity housing the stator 161 and the rotor 162, where the propellant may flow past and through the motor components, thus removing heat from the stator windings, for example, and maintaining a safe operating temperature in the turbopump 138. The propellant, after passing through the housing 151, may exit the housing at one or more first coolant outlets 165. The first coolant outlets 165 may be fluidically connected with the feed line 155 by a recirculation line 167 such that the propellant that served as coolant may be re-introduced into the turbopump 138, where most or all of the recycled propellant may be routed to the thrust chamber 101. Alternatively, the propellant that served as coolant may be re-introduced into the propellant tank 154 or simply jettisoned overboard, although this may needlessly waste propellant mass. In some implementations, the propellant that served as coolant may be routed to a portion of the injector 122 for introduction into the thrust chamber 101, e.g., such propellant may be used to supply drip orifices 128 (such a configuration may require a separate annular plenum from the annular propellant distribution plenum in order to feed the drip orifices).

Figure 26:
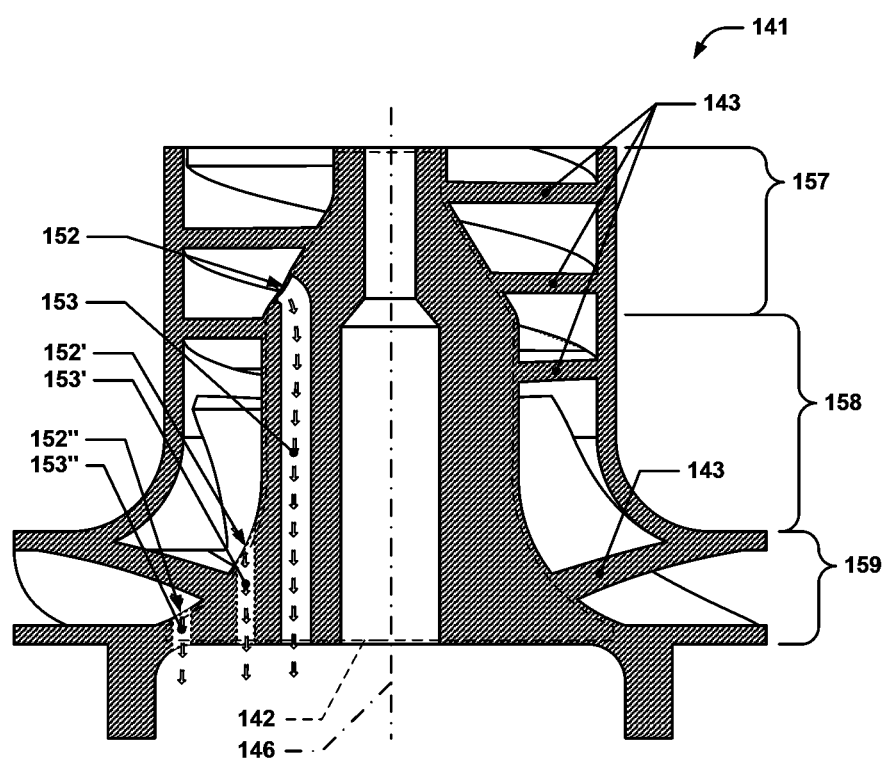
FIG. 26 depicts a side section view of the impeller for the example electrically-driven turbopump of FIG. 21 showing multiple potential locations for coolant passages within the impeller hub.

FIG. 22 depicts a side view of the impeller for the example electrically-driven turbopump of FIG. 21. FIG. 23 depicts a section view of the impeller for the example electrically-driven turbopump of FIG. 21. FIG. 24 depicts another section view of the impeller for the example electrically-driven turbopump of FIG. 21. FIG. 25 depicts yet another section view of the impeller for the example electrically-driven turbopump of FIG. 21. FIG. 26 depicts a side section view of the impeller for the example electrically-driven turbopump of FIG. 21 showing multiple potential locations for coolant passages within the impeller hub.

As can be seen, the coolant passages 153 are arranged in a three-member, evenly-spaced circular array—the coolant bypass ports 152 are intersected by the section plane for FIG. 25 and are visible in that Figure. The section view of FIG. 26 depicts the coolant bypass port 152 and the coolant passage 153, but also shows two alternative coolant bypass ports 152' and 152", as well as two alternative coolant passages 153' and 153". Generally speaking, the impeller 141 may be divided into various regions, such as a low-pressure region 157, a medium-pressure region 158, and a high-pressure region 159; the coolant bypass ports 152 may generally be located in the medium pressure region, although they may also be located in the other regions as well in some implementations. To give some sense of scale, the propellant may, in some example implementation, see pressures on the order of 100 psi in the low-pressure region, 200 psi in the medium-pressure region, and 400 psi in the high-pressure region.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower," or "vertical" and "horizontal," are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A system comprising:
   a turbopump, the turbopump including:
      an impeller, the impeller having:
         a central hub,
         a plurality of vanes arranged in one or more radially symmetric patterns about a central axis of the central hub,
         an impeller inlet configured to accept fluid flowing in a direction generally aligned with the central axis, and
         an impeller outlet configured to flow fluid passing through the impeller in a direction away from the central axis;
      an electric motor operatively connected with the impeller and configured to rotate the impeller when powered; and
      a housing, the housing having:
         a turbopump inlet configured to direct fluid provided to the turbopump into the turbopump inlet;
         a turbopump outlet configured to receive fluid from the impeller outlet; and
         one or more coolant outlets, wherein:
            the central hub further includes a plurality of coolant passages,
            each coolant passage includes a coolant bypass port located between the impeller inlet and the impeller outlet,
            each coolant bypass port is configured to be in fluidic communication with fluid that is pumped through the turbopump by the impeller when the turbopump is in use, and
            each coolant passage fluidically connects the corresponding coolant bypass port with a cooling volume of the housing that contains the electric motor,
            the cooling volume is located on an opposite side of the impeller from the turbopump inlet,
            the one or more coolant outlets are fluidically connected with the cooling volume, and
            the turbopump is configured such that when the electric motor is actuated to drive the turbopump and liquid is provided to the turbopump inlet, the impeller drives a first portion of the liquid to the turbopump outlet and a second portion of the liquid through the plurality of coolant passages into the cooling volume and out of the one or more coolant outlets.

2. The system of claim 1, further comprising:
   a rocket engine;
   a first propellant source;
   a first propellant supply line configured to supply a first propellant from the first propellant source to the turbopump inlet; and
   one or more coolant return lines configured to route the first propellant that passes into the cooling volume via the coolant passages and then out of the cooling volume via the one or more coolant outlets such that the first propellant that passes out of the cooling volume via the one or more coolant outlets is returned to the first propellant supply line and re-introduced into the turbopump inlet.

3. The system of claim 1, further comprising:
   a rocket engine;
   a first propellant source;
   a first propellant supply line configured to supply a first propellant from the first propellant source to the turbopump inlet; and
   one or more coolant return lines configured to route the first propellant that passes into the cooling volume via the coolant passages and then out of the cooling volume via the one or more coolant outlets such that the first propellant that passes out of the cooling volume via the one or more coolant outlets is returned to the first propellant source.

4. The system of claim 1, further comprising:
   a rocket engine;
   a first propellant source;
   a first propellant supply line configured to supply a first propellant from the first propellant source to the turbopump inlet; and
   one or more coolant return lines configured to route the first propellant that passes into the cooling volume via the coolant passages and then out of the cooling volume via the one or more coolant outlets such that the first propellant that passes out of the cooling volume via the one or more coolant outlets is returned to the first propellant supply line.

5. The system of claim 1, further comprising:
   a rocket engine;
   a first propellant source;
   a first propellant supply line configured to supply a first propellant from the first propellant source to the turbopump inlet; and
   one or more coolant return lines configured to route the first propellant that passes into the cooling volume via the coolant passages and then out of the cooling volume via the one or more coolant outlets such that the first propellant that passes out of the cooling volume via the one or more coolant outlets is delivered to an injector of the rocket engine.

6. The system of claim 1, further comprising:
   a shaft that couples the impeller to the electric motor; and
   a first unsealed rotational bearing that supports the shaft, at least in part, relative to the housing, wherein the turbopump is configured such that fluid that flows into the cooling volume flows through the first rotational bearing via gaps between bearing elements of the first rotational bearing.

7. The system of claim 6, further comprising a second unsealed rotational bearing that further supports the shaft, at least in part, relative to the housing, wherein:
   the electric motor includes a rotor that is interposed between the first rotational bearing and the second rotational bearing, and the second rotational bearing is located within the cooling volume and interposed between at least one of the one or more coolant outlets and the first rotational bearing.

8. The system of claim 1, wherein:
the electric motor includes a stator and a rotor,
the stator and the rotor are separated from one another by an annular gap, and
the volume between the rotor and the stator that is defined by the annular gap is part of the cooling volume.

9. The system of claim 1, wherein the coolant passages are arranged in a radially symmetric array about the central axis.

10. The system of claim 1, wherein each coolant passage is parallel to the central axis after the corresponding coolant bypass port.

11. The system of claim 1, wherein each coolant bypass port is located at a point in the central hub where the fluid pressure is between 10% and 80% of the fluid pressure at the impeller outlet when the turbopump is running.

12. The system of claim 1, wherein:
the plurality of vanes includes at least two sets of vanes,
each set of vanes is arranged in a separate radially symmetric pattern about the central axis of the central hub,
the vanes in each radially symmetric pattern occupy a different region along the central axis of the central hub when viewed along a direction perpendicular to the central axis than the vanes of the other radially symmetric pattern or patterns.

13. The system of claim 1, further comprising motor control electronics, wherein:
the motor control electronics are configured to control the electric motor, and
the motor control electronics are positioned within the housing so as to be within the cooling volume.

14. The system of claim 13, wherein the motor control electronics include power conditioning components.

15. The system of claim 13, wherein:
the electric motor is positioned between the motor control electronics and the impeller such that fluid that flows through the cooling volume from the impeller flows past the electric motor before the motor control electronics.

16. The system of claim 1, wherein:
each coolant bypass port in a first set of the coolant bypass ports is located at the same relative position with respect to a corresponding one of the vanes when viewed along the central axis.

17. The system of claim 16, wherein:
each coolant bypass port is positioned proximate to a first side of a corresponding vane, and
the first side of each corresponding vane faces towards the impeller inlet.

18. The system of claim 16, wherein:
each coolant bypass port is interposed between a first side of a corresponding vane and a second side of another vane,
the first side of each corresponding vane faces towards the impeller inlet,
the second sides face towards the first sides, and
each coolant bypass port is positioned closer to the first side than the second side of the first and second sides between which that coolant bypass port is interposed.

19. A method comprising:
providing a propellant for a rocket motor to a turbopump that includes:
an impeller having:
a central hub,
a plurality of vanes arranged in one or more radially symmetric patterns about a central axis of the central hub,
an impeller inlet configured to accept fluid flowing in a direction generally aligned with the central axis, and
an impeller outlet configured to flow fluid passing through the impeller in a direction away from the central axis, wherein:
a) the turbopump is located in a housing having:
a turbopump inlet configured to direct fluid provided to the turbopump into the turbopump inlet;
a turbopump outlet configured to receive fluid from the impeller outlet; and
one or more coolant outlets, and
b) the central hub further includes:
a plurality of coolant passages, wherein:
each coolant passage includes a coolant bypass port located between the impeller inlet and the impeller outlet,
each coolant bypass port is configured to be in fluidic communication with fluid that is pumped through the turbopump by the impeller when the turbopump is in use, and
each coolant passage fluidically connects the corresponding coolant bypass port with a cooling volume of the housing that is located on an opposite side of the impeller from the turbopump inlet and that contains an electric motor, and
the one or more coolant outlets are fluidically connected with the cooling volume; and
rotating the impeller using the electric motor operatively connected with the impeller, thereby causing a first portion of the propellant to be directed to the turbopump outlet and a second portion of the propellant to be directed through each cooling passage into the cooling volume and out of the one or more coolant outlets.

* * * * *